United States Patent
Konishi et al.

(10) Patent No.: US 9,268,998 B2
(45) Date of Patent: Feb. 23, 2016

(54) IMAGE DETERMINING APPARATUS, IMAGE PROCESSING SYSTEM, AND RECORDING MEDIUM

(71) Applicant: SHARP KABUSHIKI KAISHA, Osaka-shi, Osaka (JP)

(72) Inventors: Yohsuke Konishi, Osaka (JP); Atsuhisa Morimoto, Osaka (JP); Teruhiko Matsuoka, Osaka (JP); Daisaku Imaizumi, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 0 days.

(21) Appl. No.: 14/500,159

(22) Filed: Sep. 29, 2014

(65) Prior Publication Data

US 2015/0093031 A1 Apr. 2, 2015

(30) Foreign Application Priority Data

Sep. 30, 2013 (JP) ................................. 2013-205548

(51) Int. Cl.
*G06K 9/00* (2006.01)

(52) U.S. Cl.
CPC ................................ *G06K 9/00442* (2013.01)

(58) Field of Classification Search
CPC .......... H04N 1/00095; H04N 1/00204; H04N 1/00222; H04N 1/00228; G06F 17/30569; G06K 9/00442
See application file for complete search history.

(56) References Cited

U.S. PATENT DOCUMENTS

| | | | |
|---|---|---|---|
| 5,489,997 A | * | 2/1996 | Usami ........................ 358/522 |
| 5,563,403 A | | 10/1996 | Bessho et al. |
| 6,701,012 B1 | | 3/2004 | Matthews |
| 2003/0123696 A1 | * | 7/2003 | Matsumoto et al. .......... 382/100 |
| 2004/0165761 A1 | * | 8/2004 | Hung et al. .................... 382/141 |
| 2004/0249863 A1 | * | 12/2004 | Kawamura ................. 707/104.1 |
| 2006/0215204 A1 | * | 9/2006 | Miyamoto et al. ........... 358/1.13 |
| 2008/0134094 A1 | * | 6/2008 | Samadani et al. ............ 715/838 |
| 2010/0058180 A1 | * | 3/2010 | Hirayama et al. ............ 715/274 |
| 2010/0220366 A1 | * | 9/2010 | Kajita et al. ................. 358/448 |
| 2014/0253957 A1 | * | 9/2014 | Tye et al. ..................... 358/1.15 |
| 2014/0362248 A1 | * | 12/2014 | Ishida ........................ 348/222.1 |

FOREIGN PATENT DOCUMENTS

| JP | 6-189083 A | 7/1994 |
|---|---|---|
| JP | 7-192086 A | 7/1995 |
| JP | 2002-41502 A | 2/2002 |
| JP | 2002-94805 A | 3/2002 |

* cited by examiner

*Primary Examiner* — Jingge Wu

(74) *Attorney, Agent, or Firm* — Birch, Stewart, Kolasch & Birch, LLP

(57) ABSTRACT

An image determining apparatus of the present invention includes an image type determining section (81) which determines whether an image is a scanned image or a captured image; and a compact PDF file generation determining section (82) which (a) extracts (i) a feature regarding a resolution from the scanned image or (ii) a feature regarding a blur from the captured image and (b) determines, on the basis of the extracted feature, whether or not the image is suitable for the conversion.

7 Claims, 15 Drawing Sheets

FIG. 5

| IMAGE TYPE | MINIMUM VALUE OF ASPECT RATIO | MAXIMUM VALUE OF ASPECT RATIO |
|---|---|---|
| CAMERA-CAPTURED IMAGE I (4:3) | 1.32 | 1.34 |
| CAMERA-CAPTURED IMAGE II (16:9) | 1.77 | 1.79 |

FIG. 6

| IMAGE TYPE | MINIMUM VALUE OF ASPECT RATIO | MAXIMUM VALUE OF ASPECT RATIO |
|---|---|---|
| A SERIES PAPER SIZE DOCUMENT | 1.40 | 1.42 |
| B SERIES PAPER SIZE DOCUMENT | 1.41 | 1.43 |
| Tabloid (11x17) | 1.54 | 1.56 |
| Legal (8.5x14) | 1.64 | 1.66 |
| Letter (8.5x11) | 1.28 | 1.30 |
| Statement Half Letter (5.5x8.5) | 1.54 | 1.56 |
| 8K (270mm x 390mm) | 1.43 | 1.45 |
| 16K (195mm x 270mm) | 1.37 | 1.39 |

FIG. 15

| 0 | −1 | 0 |
|---|---|---|
| −1 | 4 | −1 |
| 0 | −1 | 0 |

FIG. 18

PART OF CONTENT OF PDF FILE (IN A CASE WHERE JPEG DATA IS CONTAINED)

```
17 0 obj
<< /Type /XObject /Subtype /Image /Width 2480 /Height 3508
/ColorSpace /DeviceRGB /BitsPerComponent 8
/Filter [/DCTDecode ] /Length 18 0 R >>
Stream
  :
  :
endstream
endobj
```

JPEG DATA

INDICATING THAT THE DATA IS JPEG DATA

IMAGE DETERMINING APPARATUS, IMAGE PROCESSING SYSTEM, AND RECORDING MEDIUM

This Nonprovisional application claims priority under 35 U.S.C. §119 on Patent Application No. 2013-205548 filed in Japan on Sep. 30, 2013, the entire contents of which are hereby incorporated by reference.

TECHNICAL FIELD

The present invention relates to (i) an image determining apparatus which determines whether or not an image is suitable for a conversion into a compact PDF file, (ii) an image processing system, (iii) a program, and (iv) a recording medium.

BACKGROUND ART

There is a technique in which image data collected by a mobile terminal apparatus or the like is (i) transmitted, via a network, to a server and then (ii) converted, by the server, into a file format at user's request. For example, Patent Literature 1 discloses a system in which upon receipt of (i) digital image data generated by a terminal, (ii) the relevant data, and (iii) instruction information on data process from the terminal via a network, a server processes the digital image data and the relevant data in a given format in accordance with the instruction information so as to generate a document. The generated document (i) is stored, as a report for specific purpose, in a recording medium, (ii) is printed as a paper document, or (iii) is transmitted to a specific server apparatus via a network.

CITATION LIST

Patent Literature

Patent Literature 1
Japanese Patent Application Publication, Tokukai, No. 2002-41502 A (Publication Date: Feb. 8, 2002)

SUMMARY OF INVENTION

Technical Problem

Note, however, that the following problem arises in a case where image data collected by a mobile terminal apparatus or the like is transmitted to a server, and a compact PDF file of the image data is generated as a given format. That is, a display quality of the compact PDF file may be considerably deteriorated due to the following reasons (i) and (ii). (i) In a case where the image data has been captured by a camera, a blur or the like may occur in the image data while the image data is being captured; and (ii) in a case where the image data has been scanned by a scanner of an MFP (multifunction printer) or the like, a scanning resolution (reading resolution) may be low. This problem occurs because it is not determined whether or not the transmitted image is suitable for generation of a compact PDF file. Note, however, that, in a case where a user is caused to determine whether or not the transmitted image is suitable for generation of the compact PDF file, a burden is imposed on the user.

The present invention has been made in view of the problems, and an object of the present invention is to provide an image determining apparatus capable of determining whether or not an image is suitable for a conversion into a compressed image in a platform independent file format, so as to save a user the trouble.

Solution to Problem

In order to attain the problem, the image determining apparatus of one aspect of the present invention is an image determining apparatus including: an image type determining section which determines whether an input image is a scanned image scanned by a scanner or a captured image captured by an image-capturing apparatus; and a format conversion determining section which determines, on the basis of a result of the determination by the image type determining section, whether or not the input image is suitable for conversion into a compressed image in a platform independent file format, the format conversion determining section (a) extracting (i) a feature regarding a resolution from the input image determined as the scanned image or (ii) a feature regarding a blur from the input image determined as the captured image and (b) making the determination on the basis of the extracted feature.

Advantageous Effects of Invention

The arrangement brings about an effect of being capable of determining whether or not an image is suitable for a conversion into a compact image in a platform independent file format, so as to save a user the trouble.

BRIEF DESCRIPTION OF DRAWINGS

FIG. 5 is a diagram illustrating an example of an aspect ratio of a selected image size.

FIG. 6 is a diagram illustrating another example of an aspect ratio of a selected image size.

Figure 12:
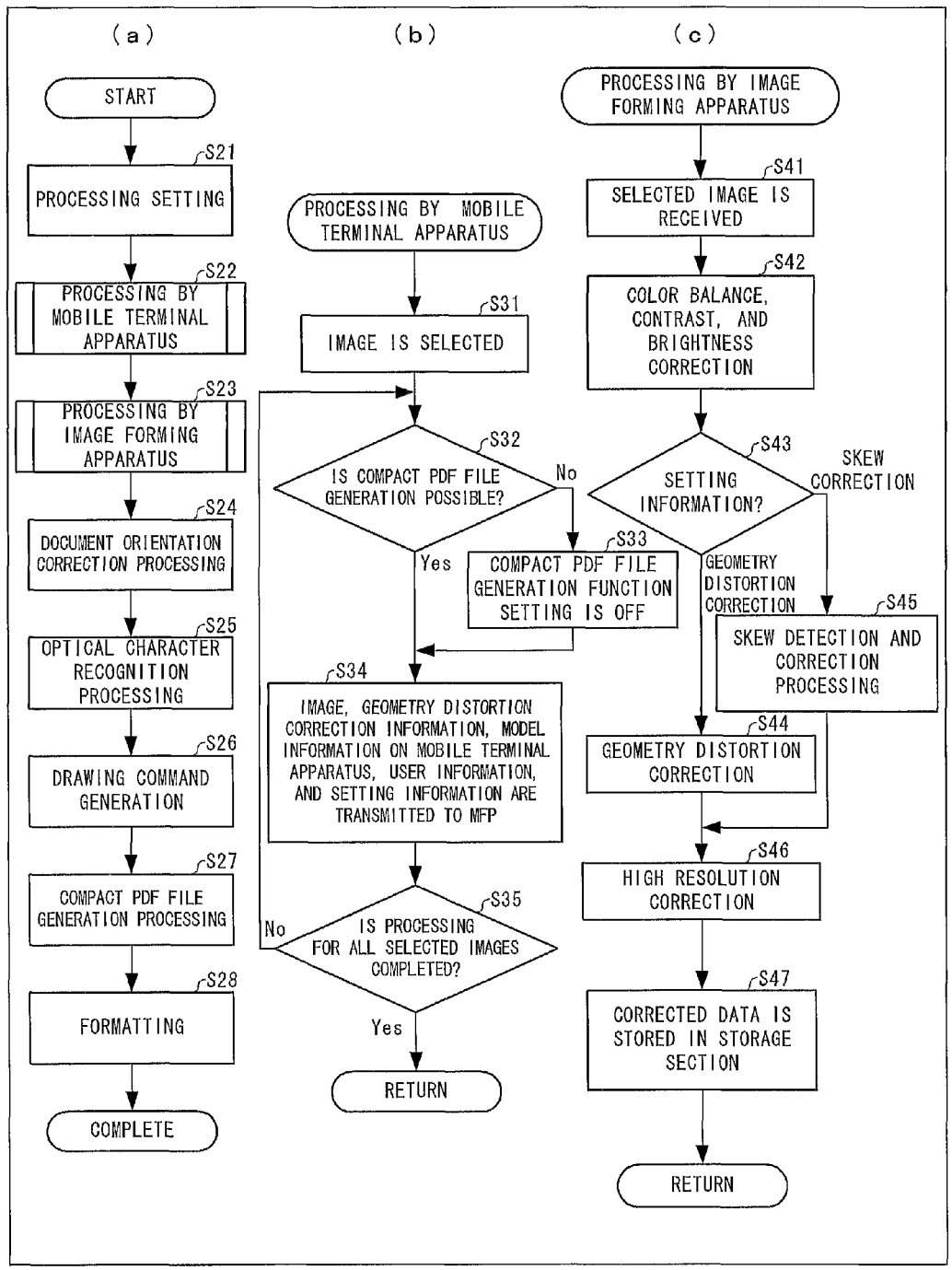

(a) through (c) of FIG. 12 are each a flow chart illustrating processing carried out by an image processing system of an embodiment of the present invention.

Figure 13:
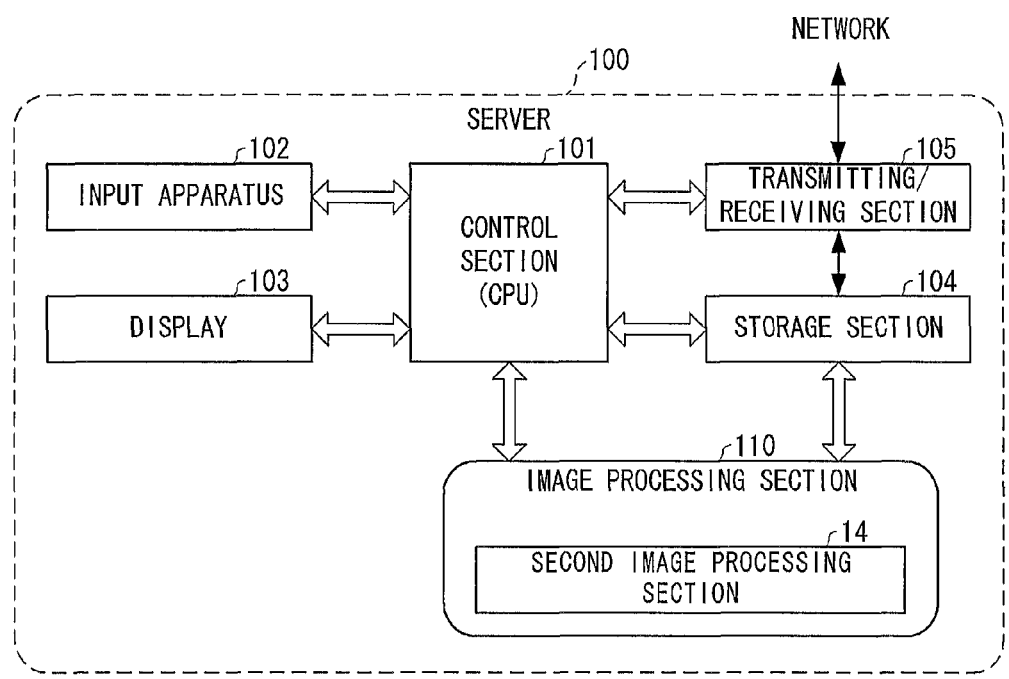

FIG. 13 is a block diagram illustrating a server apparatus of an embodiment of the present invention.

Figure 14:
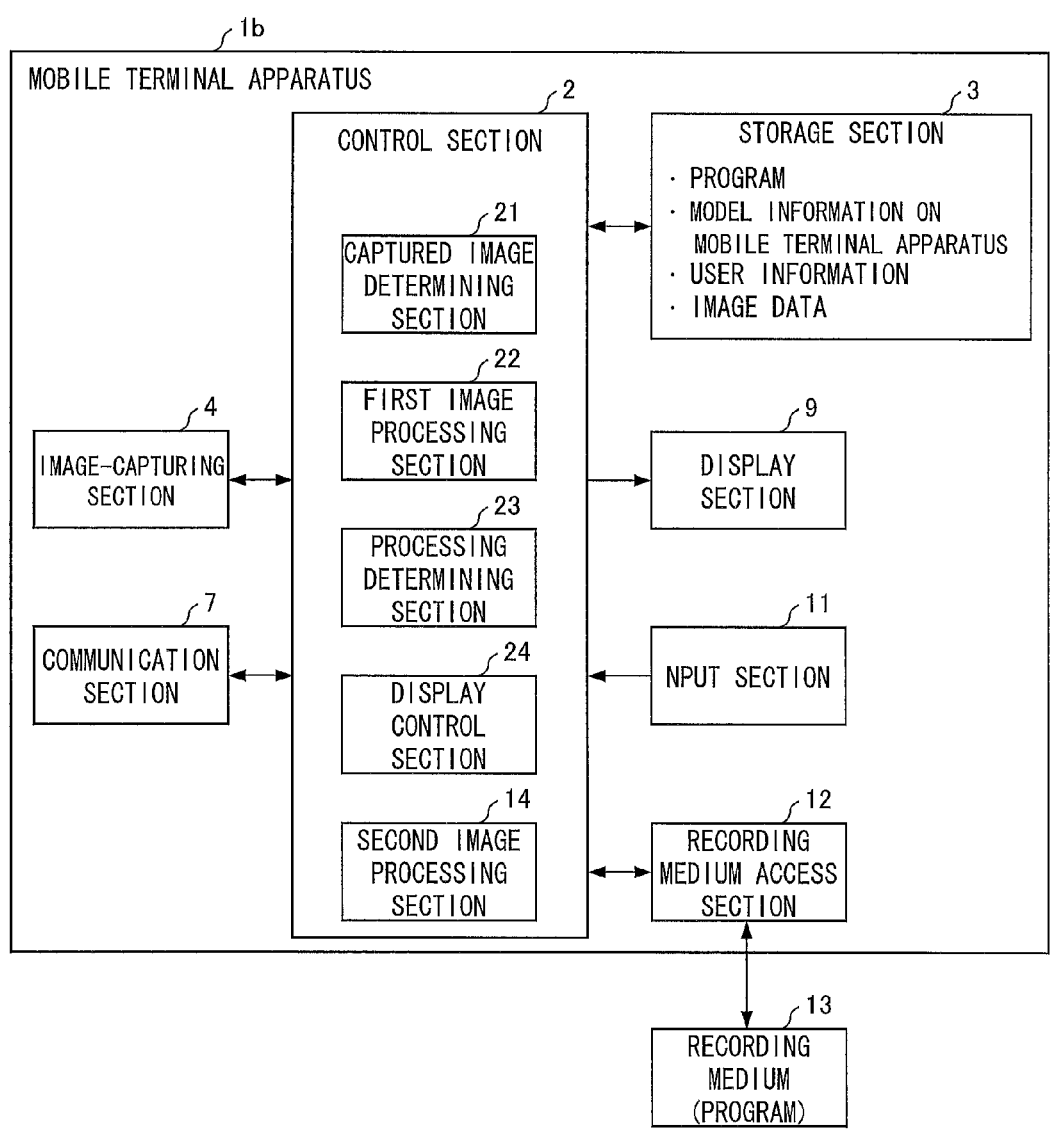

FIG. 14 is a block diagram illustrating a configuration of a mobile terminal apparatus of another embodiment of the present invention.

Figure 15:
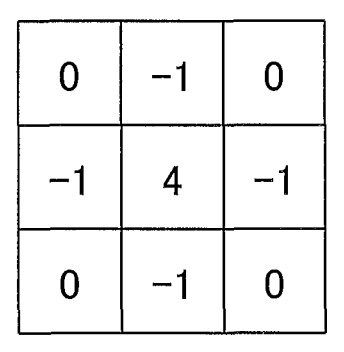

FIG. 15 is a diagram illustrating an example of a first order differential filter.

Figure 16:
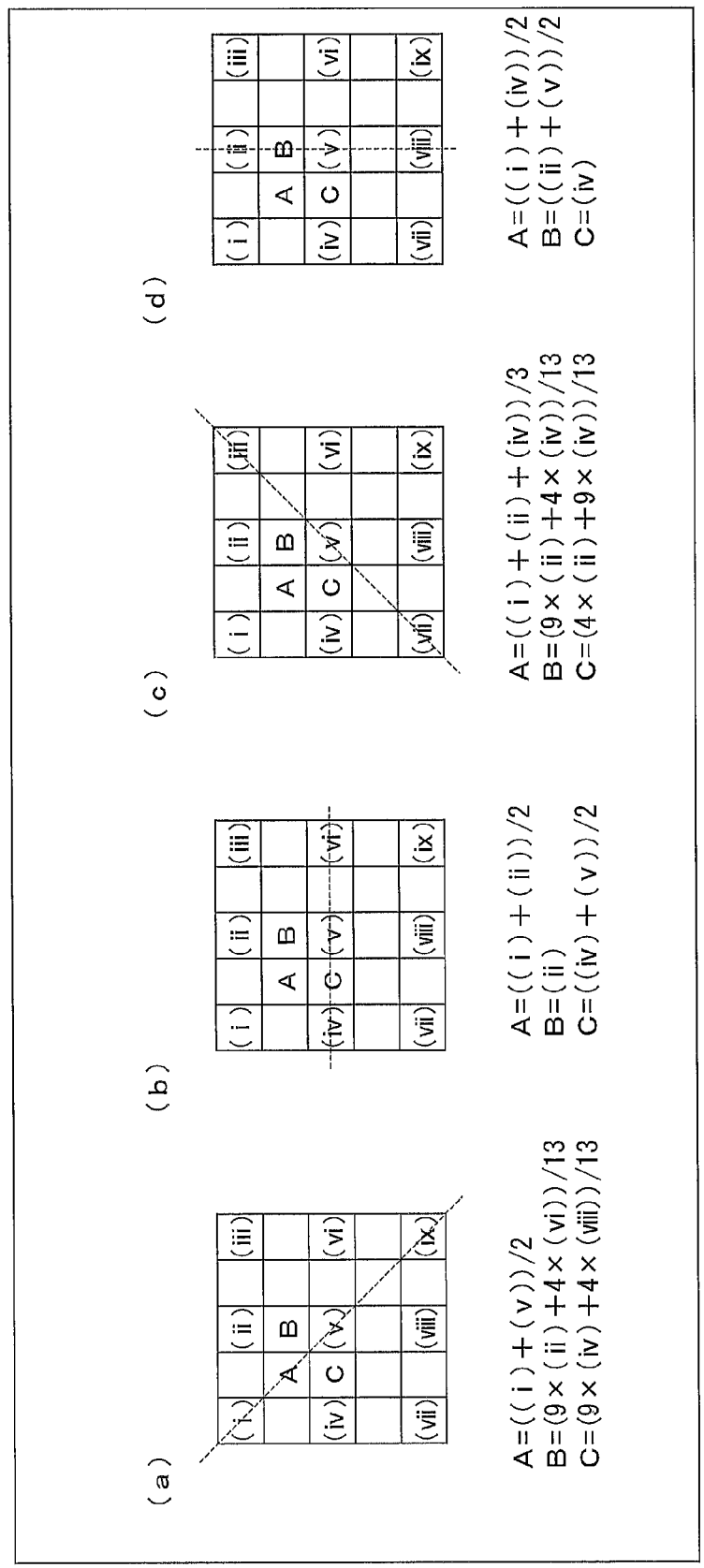

(a) through (d) of FIG. 16 are each a diagram illustrating an example of a method of determining a pixel value of an interpolation pixel.

Figure 17:
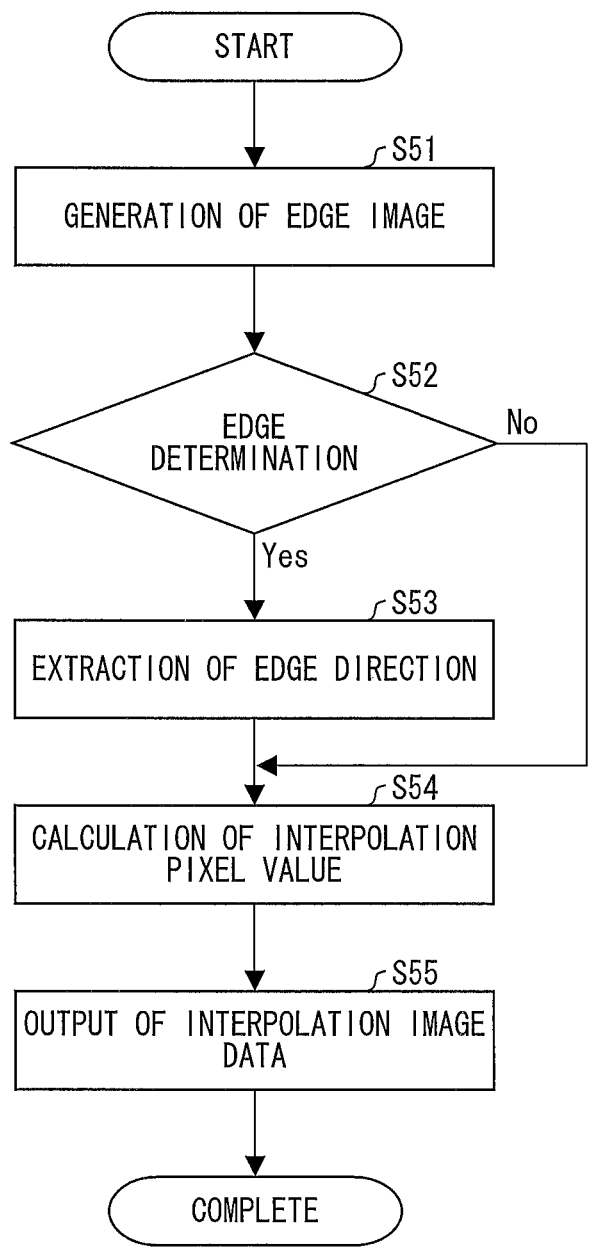

FIG. 17 is a flow chart illustrating an example of edge direction interpolation processing.

FIG. 18 is a diagram illustrating a part of a content of a PDF file containing JPEG data.

DESCRIPTION OF EMBODIMENTS

The following description will explain in detail embodiments of the present invention with reference to the drawings.

Embodiment 1

1. Image Processing System

An image processing system (not shown) of Embodiment 1 is arranged such that a mobile terminal apparatus (image determining apparatus) 1 is connected to an image forming apparatus (MFP, multifunction printer) 50 via a network. Image data (image) selected by a user is transmitted from the mobile terminal apparatus 1 to the image forming apparatus 50 via the network and is then outputted by the image forming apparatus 50. A communication form of the network is not limited to a specific one, and the network can therefore be wireless or wired.

Note here that image data transmitted from the mobile terminal apparatus 1 is image data selected by a user. Examples of the image data encompass image data captured by an image-capturing section 4 (later described) of the mobile terminal apparatus 1 and image data obtained from a server apparatus (not shown) via a network. Examples of the image data selected by the user encompass (i) captured image data (captured image (camera-captured image)) which has been captured by an image-capturing apparatus including the image-capturing section 4 and (ii) scanned image data (scanned image obtained by scanning a document placed on a platen glass) which has been scanned by a scanner (including a scanning function of an image forming apparatus). Note, however, that the captured image data is not subjected to any geometry distortion correction or the like, i.e., the captured image data is not subjected to any image processing after the image is captured. The following description will explain on the premise that the captured image data captured by the image-capturing section 4 of the mobile terminal apparatus 1 is stored in the mobile terminal apparatus 1. Note, however, that it is possible to directly (select and) transmit the captured image data captured by the image-capturing section 4, instead of transmitting the captured image data stored in a storage section 3.

According to Embodiment 1, particularly, the mobile terminal apparatus 1 determines whether or not image data (input image) is suitable for a conversion into a compressed image in a platform independent file format (suitable for generation of an image). The mobile terminal apparatus 1 transmits, to the image forming apparatus 50, the determination information together with the image data. In the following description, a compact PDF file is used as the compressed image in the platform independent file format. Note, however, that the compressed image in the platform independent file format is not limited to the compact PDF file.

The image forming apparatus 50 carries out image processing with respect to the received image data and then outputs the image data which has been subjected to the image processing. In a case where the image forming apparatus 50 receives (i) setting information instructing a conversion of the image data into a compact PDF file (generation of a compact PDF file of the image data) (i.e., information which specifies a compact PDF file as an output file format) and (ii) information indicating that it has been determined that the received image data is suitable for the conversion into the compact PDF file, the image forming apparatus 50 converts the received image data into a compact PDF file and then outputs converted image data. Examples of output processing carried out by the image forming apparatus 50 encompass printing processing of printing/outputting image data, filing processing of storing an image in a storage apparatus such as a server apparatus or a USB memory, and e-mail sending processing of sending an e-mail to which image data is attached.

2. Configuration of Mobile Terminal Apparatus

Figure 1:
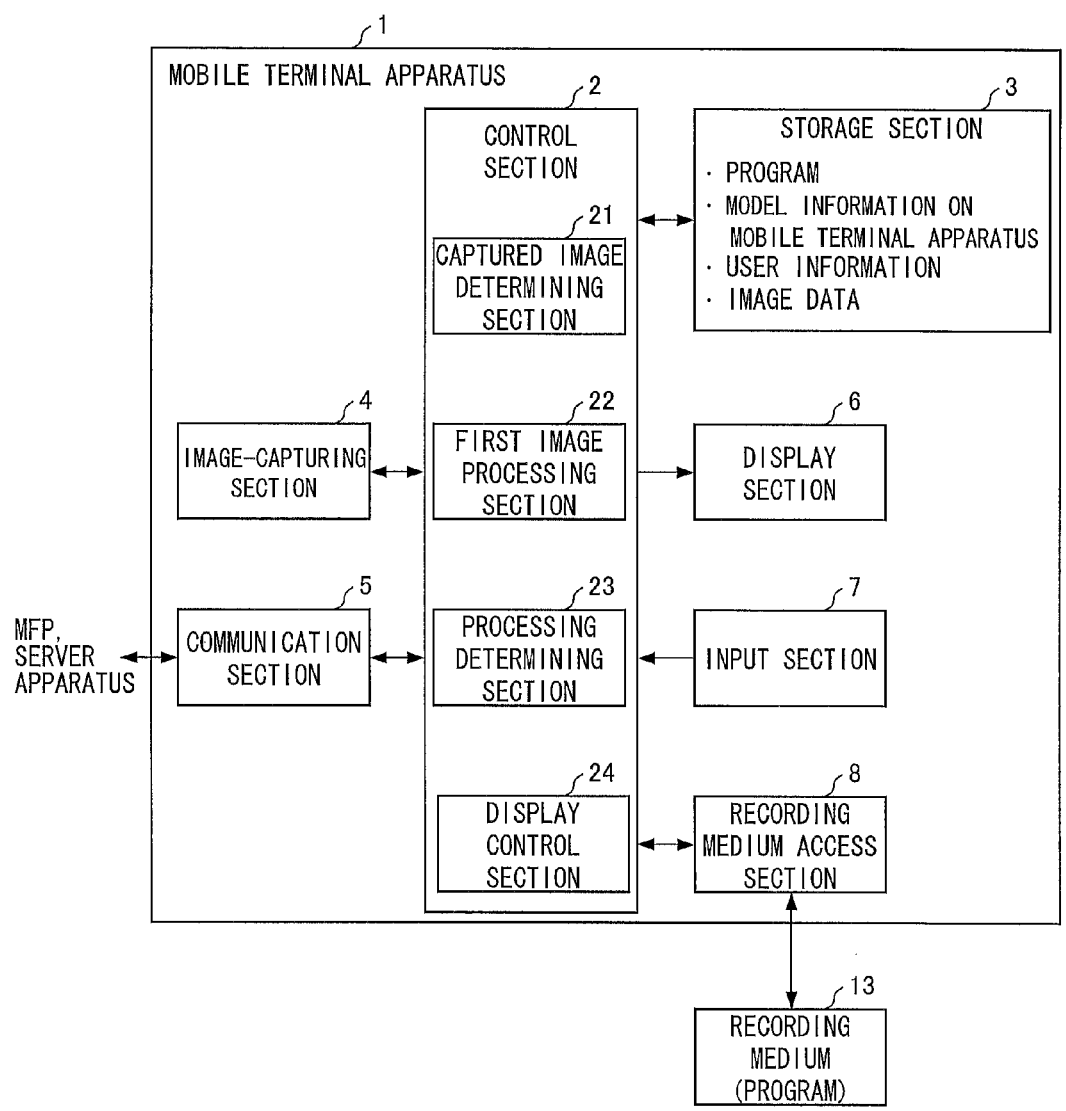
FIG. 1 is a block diagram illustrating a configuration of a mobile terminal apparatus of an embodiment of the present invention.

The following description will explain the mobile terminal apparatus 1 with reference to FIG. 1. FIG. 1 is a block diagram illustrating a configuration of the mobile terminal apparatus 1. The mobile terminal apparatus 1 includes a control section 2, a storage section 3, an image-capturing section (image-capturing apparatus) 4, a communication section 5, a display section 6, an input section 7, and a recording medium access section 8 (see FIG. 1). Examples of the mobile terminal apparatus 1 encompass a smartphone, a tablet terminal, and a mobile phone.

The control section 2 controls each block of the mobile terminal apparatus 1. The control section 2 analyzes a header of a file stored in the storage section 3 so as to recognize a format of the file. The recognition of the file format will be later described.

In a case where an instruction is inputted from the input section 7, which instruction instructs the image forming apparatus 50 to output image data selected by a user, the control section 2 controls the display section 6 to display a screen prompting the user to input (i) an instruction to select a type of output processing carried out by the image forming apparatus 50 (e.g. printing processing, filing processing, and e-mail sending processing) and (ii) a setting condition (e.g. a printing condition such as the number of printing, an address of a server to which filing is to be carried out, and an e-mail destination address) for carrying out selected output processing. Then, the control section 2 obtains, from the input section 7, setting information indicative of the type of output processing and the setting condition for the output processing.

In a case where a transmission instruction is entered from the input section 7, the control section 2 controls the communication section 5 to carry out transmitting processing in which selected image data is transmitted to the image forming apparatus 50. In doing so, the communication section 5 transmits, to the image forming apparatus 50, the setting information associated with the selected image data, together with (i) the selected image data, (ii) model information on the mobile terminal apparatus 1 and (iii) user information which are stored in the storage section 3.

The storage section 3 stores therein a program and data for each processing carried out by the mobile terminal apparatus 1. The storage section 3 further stores therein image data. Examples of the image data encompass (i) captured image data obtained when the image-capturing section 4 captured and (ii) captured image data and scanned image which have been received from an external apparatus (including a server apparatus and an image forming apparatus).

The storage section 3 further stores therein model information on the mobile terminal apparatus 1, user information, and data required for carrying out the processing. Note that the user information is information for identifying a user of the mobile terminal apparatus 1. Examples of the user information encompass a user ID and a password.

The image-capturing section 4 captures an object with the use of a CCD sensor or a CMOS sensor, and then generates captured image data. Note that the image-capturing section 4 captures an object at preset resolution.

According to Embodiment 1, the communication section 5 has a serial transfer/parallel transfer function based on USB (Universal Serial Bus) 1.1 or USB 2.0 and a wireless data communication function. The communication section 5 transmits the image data to the image forming apparatus 50 or the server apparatus in accordance with user input.

The display section 6 is realized by, for example, a liquid crystal display and the like, and displays various types of images and various types of information. The input section 7 has a plurality of buttons by which a user enters an input etc. with respect to the mobile terminal apparatus 1. Examples of the buttons encompass a shutter button, an autofocus setting button, an exposure adjusting bar, an image reading button (a button for reading out image data from the storage section 3), and a condition setting button. According to Embodiment 1, a touch panel is provided in which a display section 56 and an input section 57 are integrated with each other.

The recording medium access section 8 is a block which reads out a program from a recording medium 13 which stores a program for carrying out each processing of the mobile terminal apparatus 1.

The control section 2 functions as a captured image determining section 21, a first image processing section 22, a processing determining section 23, and a display control section 24.

Figure 2:
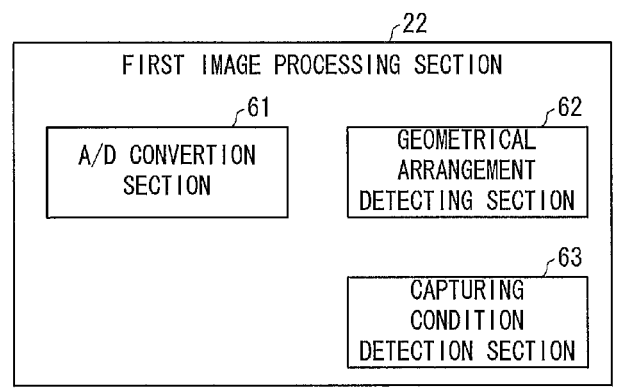
FIG. 2 is a block diagram illustrating a configuration of a first image processing section of the mobile terminal apparatus.

The first image processing section 22 includes an A/D conversion processing section 61, a geometrical arrangement detecting section 62, and a capturing condition detection section 63 (see FIG. 2). The A/D conversion processing section 61 carries out A/D conversion processing with respect to captured image data which has been captured by the image-capturing section 4.

The geometrical arrangement detecting section 62 carries out an edge detection, an extraction of a line segment, and a calculation of an intersection of line segments, with respect to (i) captured image data which has been captured by the image-capturing section 4 or (ii) captured image data which has been selected by a user and is stored in the storage section 3. Specifically, the geometrical arrangement detecting section 62 assumes that the object has a rectangular shape and extracts groups of edge pixels that draw a boundary between an object and a background. This allows a geometrical arrangement (geometrical distortion) of the object to be detected. For this purpose, the geometrical arrangement detecting section 62 carries out, with respect to the captured image data, the edge detection, the extraction of a line segment, and the calculation of an intersection of line segments.

The capturing condition detection section 63 determines a position of a captured image with respect to (i) the captured image data which has been captured by the image-capturing section 4 or (ii) the captured image data which has been selected by a user and is stored in the storage section 3. Specifically, based on the information on the intersection of the line segments which intersection has been calculated by the geometrical arrangement detecting section 62, the capturing condition detection section 63 determines whether or not an object in the captured image data is completely in the captured image data.

The captured image determining section 21 determines, in accordance with a result detected by the first image processing section 22, whether or not (i) the captured image data which has been captured by the image-capturing section 4 or (ii) the captured image data which has been selected by an input selection instruction by a user and is stored in the storage section 3 is appropriate data. Specifically, the captured image determining section 21 determines, in accordance with the result of the determination made by the capturing condition detection section 63, whether or not four intersections which form a region of a document are in the captured image data so that the geometry distortion correction can be made. In a case where the intersections with which the geometry distortion correction can be made are in the captured image data, the captured image determining section 21 determines that the captured image data is appropriate.

Figure 3:
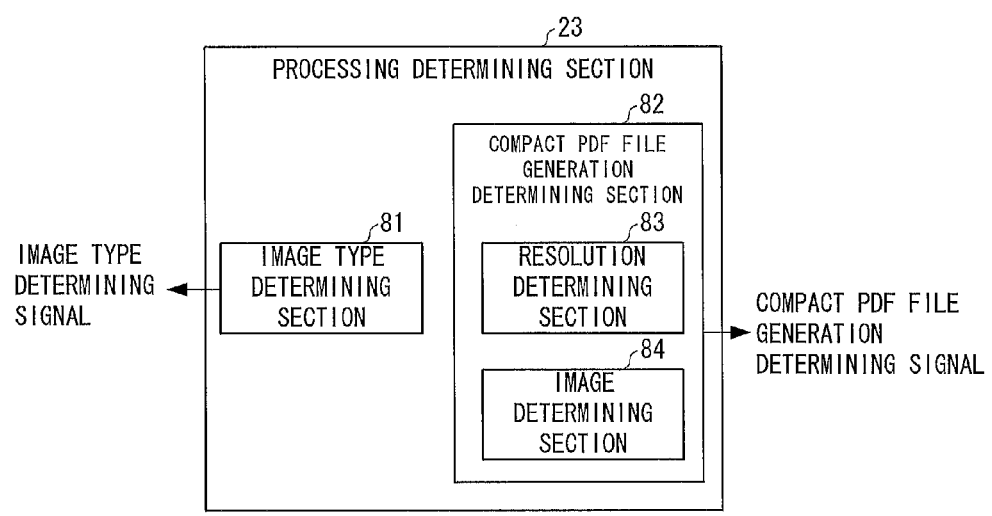
FIG. 3 is a block diagram illustrating a configuration of a processing determining section of the mobile terminal apparatus.

The processing determining section 23 includes an image type determining section 81 and a compact PDF file generation determining section (format conversion determining section) 82 (see FIG. 3).

The image type determining section 81 carries out image type determining processing in which it is determined whether image data (input image) selected by a user is a captured image or a scanned image. The image type determining section 81 then outputs a result of the determination as an image type determining signal. The image type determining signal is one of a signal indicating that the image data is a "captured image", a signal indicating that the image data is a "scanned image", and a signal indicating that the image data is "undetermined." The image type determining processing will be later described in detail.

The compact PDF file generation determining section 82 carries out compact PDF file generation determining processing in which it is determined whether or not selected image data is suitable for generation of a compact PDF file (a conversion into a compact PDF file), i.e., whether or not generation of a compact PDF file of the selected image data (a conversion of the selected image data into a compact PDF file) is possible. As a result, the compact PDF file generation determining section 82 outputs a compact PDF file generation determining signal.

The compact PDF file generation determining section 82 includes a resolution determining section 83 and an image determining section 84. The resolution determining section 83 carries out resolution determining processing with respect to an image which has been determined as a scanned image. In the resolution determining processing, a feature regarding a resolution is extracted and it is then determined whether or not the feature falls within a predetermined range. Note that, in a case where the feature falls within the predetermined range, the resolution is determined to be relatively high. In a case where the extracted feature is within the predetermined range, it is determined that the image data, which has been determined as a scanned image, is suitable for generation of a compact PDF file. According to Embodiment 1, as later described, the resolution itself is used as the feature regarding the resolution, and in a case where the resolution of the image data is higher than a given threshold, it is determined that the image data is suitable for the generation of the compact PDF file.

The image determining section 84 extracts a feature regarding a blur with respect to an image which has been determined as a captured image. In a case where the feature falls within a predetermined range, the image determining section 84 determines that the image which has been determined as the captured image is suitable for the generation of the compact PDF file. Note that, in a case where the feature falls within the predetermined range, a degree of blur is determined to be relatively low.

The compact PDF file generation determining processing, the resolution determining processing, and the image determining processing will be later described in detail.

Figure 4:
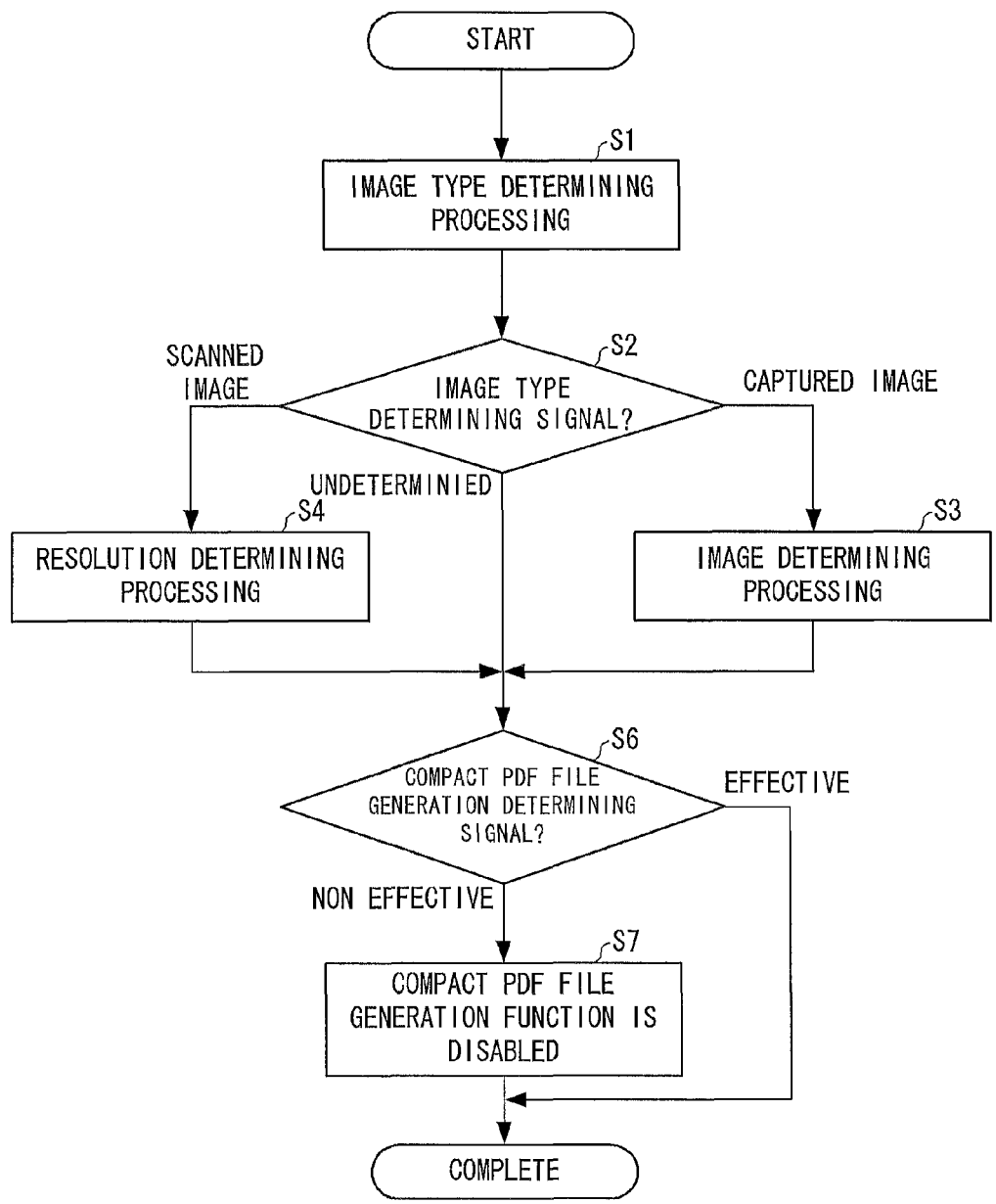
FIG. 4 is a flow chart illustrating processing carried out by the processing determining section.

FIG. 4 is a flow chart illustrating processing carried out by the processing determining section 23. As illustrated in FIG. 4, the processing determining section 23 carries out image type determining processing with respect to image data selected by a user, i.e., image data to be transmitted to the image forming apparatus 50 (Step 1; hereinafter abbreviated as S1). The processing determining section 23 makes a determination of an image type determining signal indicating a result of the image type determining processing (S2). In a case where it is determined that the image type determining signal indicates that the image data is the "captured image," image determining processing is carried out (S3). On the other hand, in a case where it is determined that the image type determining signal indicates that the image data is the "scanned image," resolution determining processing is carried out (S4). The processing determining section 23 then makes a determination of a compact PDF file generation determining signal (S6). In a case where it is determined that the image type determining signal indicates that the image data is undetermined, the processing determining section 23 directly makes a determination of the compact PDF file generation determining signal (S6). In a case where the compact PDF file generation determining signal is effective, the processing is completed. On the other hand, in a case where it is determined that the compact PDF file generation determining signal is non effective, a setting of a compact PDF file generation function is disabled and the processing is completed. Note that, upon receipt of information indicating that the setting of the compact PDF file generation function is effective together with the image data, the image forming apparatus 50 generates a compact PDF file from received image data.

The display control section 24 is a block which controls the display section 6 to display various types of information, various types of image data, and the like (see FIG. 1). The display control section 24 reads out, from the image data stored in the storage section 3, image data selected by a user, and controls the display section 6 to display the image data. The display control section 24 controls the display section 6 to display (i) an instruction mark indicating an outer frame of a detected image (a line segment indicating an outer edge of a document (a document edge, a document boundary)) and (ii) an instruction mark indicating whether or not an image is to be properly captured (whether or not the image is to be partially cut off). Note that, in a case where captured image data stored in the storage section 3 is selected, the instruction mark (ii) indicates whether or not the captured image data is a result of being properly captured. On the other hand, in a case where an image is to be captured by the image-capturing section 4, the instruction mark (ii) indicates whether or not the image is to be properly captured. This is because (a) in a case where the image data captured by the image-capturing section 4 is in a state in which a geometry distortion correction can be made, an image may be captured by a user operation or (b) in a case where it is determined that the image data captured by the image-capturing section 4 is, for a certain time period, in a state in which the geometry distortion correction can be made, an image may be automatically captured.

Note here that the display control section 24 controls the display section 6 not to display the instruction marks (i) and (ii), in a case where (a) the image data selected from the image data stored in the storage section 3 is displayed and (b) an image type determining signal, outputted from the image type determining section 81 of the processing determining section 23, indicates a "scanned image." A result detected when the captured image data has been captured is used to obtain the instruction marks (i) and (ii). Instruction marks (i) and (ii) of captured image data having no information on the instruction marks (i) and (ii) are obtained by a calculation which will be later described.

<Recognition of File Format>

The following description will explain recognition of the file format carried out by the control section 2. The control section 2 analyzes a header of a file stored in the storage section 3 so as to recognize a file format of the file. In a case of a PDF file, the control section 2 determines whether or not the file contains JPEG data, by confirming whether or not the file includes an object compressed in a DCTDecode mode. In a case where it is determined that the file contains the JPEG data, the control section 2 controls each of the processing determining section 23 and the compact PDF file generation determining section 82 to carry out corresponding processing by using, as JPEG data, binary data of the object which binary data is specified by a stream command. Just for reference, FIG. 18 illustrates a part of a content of a PDF file containing JPEG data.

Figure 11:
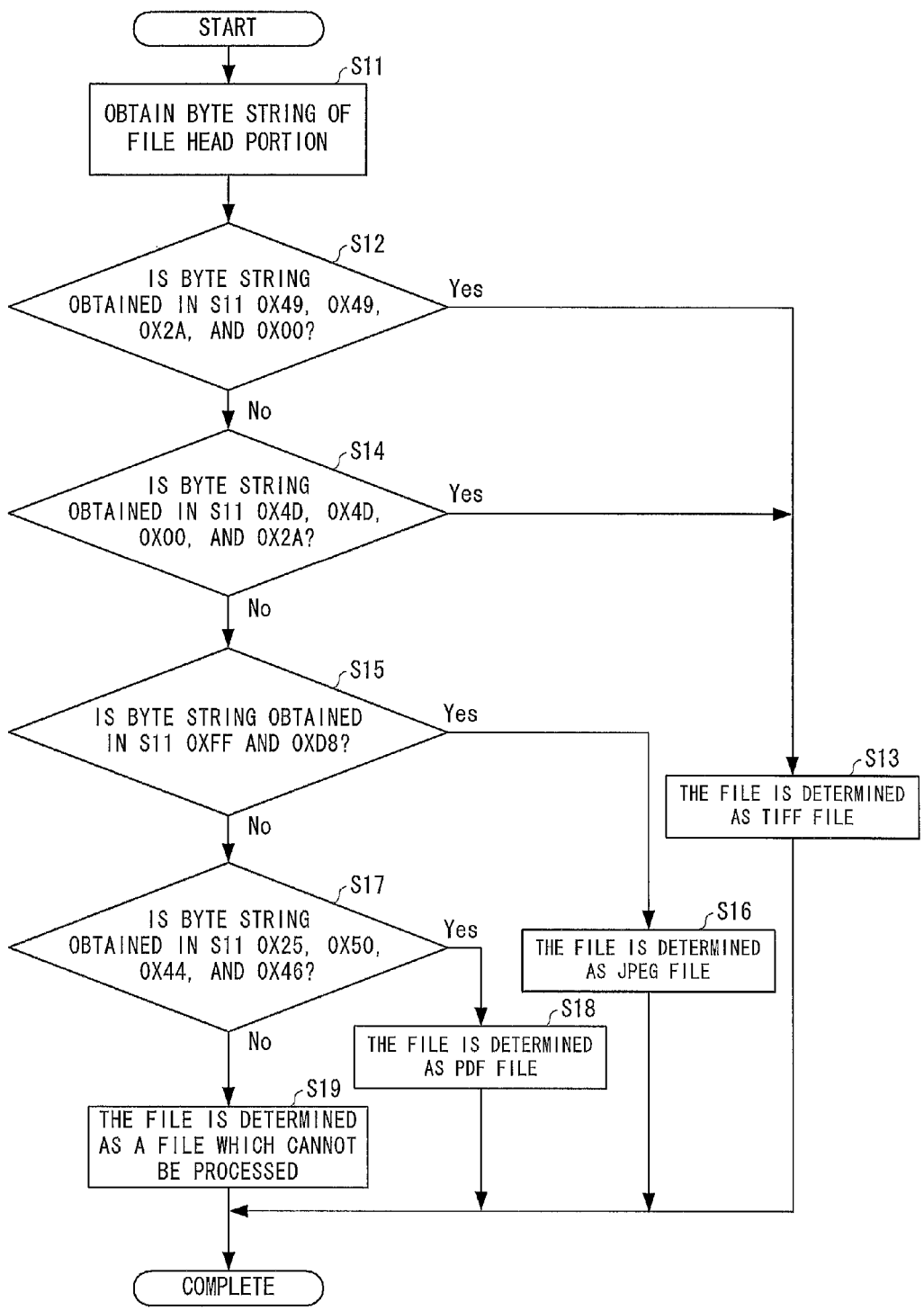
FIG. 11 is a flow chart illustrating a method of recognizing a file format of a file.

FIG. 11 is a flow chart illustrating a method of recognizing a file format of a file stored in the storage section. Since files in various formats are each likely to have a characteristic byte string of a file head portion, a type of the file can be easily recognized by confirming the byte string of the file head portion.

As illustrated in FIG. 11, the control section 2 obtains a byte string of a file head portion (S11), and determines whether or not the byte string obtained in S11 is 0x49, 0x49, 0x2A, and 0x00 in hexadecimal number (S12). In a case of YES in S12, the control section 2 determines that the file is a TIFF image file (S13). In a case of NO in S12, the control section 2 determines whether or not the byte string obtained in S11 is 0x4D, 0x4D, 0x00, and 0x2A in hexadecimal number (S14). In a case of YES in S14, the control section 2 determines that the file is a TIFF image file (S13). In a case of NO in S14, the control section 2 determines whether or not the byte string obtained in S11 is 0xFF and 0xD8 in hexadecimal number (S15). In a case of YES in S15, the control section 2 determines that the file is a JPEG image file (S16). In a case of NO in S15, the control section 2 determines whether or not the byte string obtained in S11 is 0x25, 0x50, 0x44, and 0x46 in hexadecimal number (S17). In a case of YES in S17, the control section 2 determines that the file is a PDF file (S18). In a case of NO in S17, the control section 2 determines that the file is a file which cannot be processed (S19).

That is, the control section 2 makes the determination as follows.

(1) In a case where the byte string obtained in S11 is 0x49, 0x49, 0x2A and 0x00 in hexadecimal number, the control section 2 determines that the file is a TIFF image file.

(2) In a case where the byte string obtained in S11 is 0x4D, 0x4D, 0x00, and 0x2A in hexadecimal number, the control section 2 determines that the file is a TIFF image file.

(3) In a case where the byte string obtained in S11 is 0xFF and 0xD8 in hexadecimal number, the control section 2 determines that the file is a JPEG image file.

(4) In a case where the byte string obtained in S11 is 0x25, 0x50, 0x44, and 0x46 in hexadecimal number, the control section 2 determines that the file is a PDF file.

(5) In a case where none of the above cases (1) through (4) applies, the control section 2 determines that the file is a file which cannot be processed.

<Image Type Determining Processing>

The following description will specifically explain the image type determining processing carried out by the image type determining section 81. The image type determining processing is carried out in accordance with the following steps (1) through (4).

(1) A size of selected image data in a longitudinal direction and a size of the selected image data in a transverse direction are obtained. An aspect ratio is then obtained by dividing the size of a longer side by the size of a shorter side. Note that the size of the selected image data in the longitudinal direction and the size of the selected image data in the transverse direction are calculated from the number of pixels stored in a header of the image data.

(2) The obtained aspect ratio is compared with an aspect ratio (16:9 or 4:3) of a captured image captured by a regular camera, In a case where the aspect ratio of the size of the selected image falls within a range of an aspect ratio shown in FIG. 5, the selected image is determined as a captured image captured by a camera.

(3) In a case where the selected image is not determined, in step (2), as a captured image captured by a camera, the aspect ratio of the size of the selected image is compared with an aspect ratio of an image size used in a regular multifunction printer or scanner. In a case where the aspect ratio of the size of the selected image is within a range of an aspect ratio shown in FIG. 6, the selected image is determined as a scanned image.

(4) In a case where neither of the conditions in steps (2) nor (3) is satisfied, a signal, indicating that the image type of the selected image data is undetermined, is outputted.

<Compact PDF File Generation Determining Processing>

The following description will specifically explain the compact PDF file generation determining processing carried out by the compact PDF file generation determining section 82. In accordance with an image type of the selected image data (i.e., a "scanned image", a "captured image", or "undetermined") determined as a result of the image type determination made by the image type determining section 81, the compact PDF file generation determining processing is carried out as follows.

(1) In a case where the selected image data is scanned image

In a case where the selected image data is determined as a "scanned image" as a result of the image type determination, the resolution determining section 83 carries out resolution determining processing as below.

(1-1) Resolution information (resolution) is obtained from selected image data (input image). In a case where an image data is a TIFF file (in a case where a file format of the image data is a TIFF file), the resolution information can be obtained by referring an XResolution tag (resolution unit), a YResolution tag (lateral direction resolution), and a ResolutionUnit tag (longitudinal direction resolution) in the TIFF file. On the other hand, in a case where the image data is a JPEG file, the resolution information can be obtained by referring, based on JFIF information contained in the file, information on units (resolution unit), Xdensity (lateral direction resolution), and Ydensity (longitudinal direction resolution).

(In a case where the selected image is TIFF file)

(i) In a case where the ResolutionUnit tag is equal to 1 or 2, XResolution and YResolution are used, as they are, as resolution information.

(ii) In a case where the ResolutionUnit tag is equal to 3 (since the resolution unit is dpcm (dot per centimeter), a conversion is necessary), XResolution×2.54 and YResolution×2.54 are used as resolution information.

(In a case where the selected image is JPEG file)

(i) In a case where the units are equal to 0 or 1, Xdensity and Ydensity are used, as they are, as resolution information.

(ii) In a case where the units are equal to 2 (since the resolution unit is dpcm, a conversion is necessary), Xdensity× 2.54 and Ydensity×2.54 are used as resolution information.

In a case where the resolution information in a longitudinal direction differs from the resolution information in a transverse direction, the following detection processing is carried out with the use of information on a lower resolution. This is because, as a resolution of an image is lower, such an image is considered as more unsuitable for generation of a compact PDF file.

(1-2) In a case where the resolution information of the image is, for example, less than 200 dpi, it is determined that the image is unsuitable for the generation of the compact PDF file, and then a compact PDF file generation determining signal is outputted. In a case where the resolution information of the image is 200 dpi or more, it is determined that a compact PDF file of the image can be generated, and then the compact PDF file generation determining signal is outputted. The following is the reason why, in a case where an image has a low resolution, it is determined that such an image is unsuitable for the generation of the compact PDF file. In the compact PDF file generation processing, as the resolution of the image is lower, an accuracy of extracting a text part as a foreground mask is more reduced. This causes the text part to be more easily determined as a background layer. Since the background layer is subjected to compression processing with high compression efficiency, image quality is deteriorated in the text part which has been determined as the background layer, as compared with that of an image having a high resolution. For this reason, it is determined that the image having a low resolution is unsuitable for the generation of the compact PDF file. In a case of a file which cannot be processed, resolution information of the file cannot be obtained (see the above description regarding the control section 2). Accordingly, a resolution of such a file is made undetermined.

(2) In a case where the selected image data is captured image

In a case where the selected image data is determined as a "captured image" as a result of the image type determination, the image determining section 84 carries out image determining processing as below.

(2-1) RGB image data is converted into luminance data, and an absolute value of a difference between respective adjacent pixels is calculated. The RGB image data is converted into the luminance data, as with a conversion carried out by the signal conversion section (later described). It is possible to use brightness data or G data, instead of the luminance data. The absolute value of the difference is calculated for each pixel.

(2-2) An average value of the absolute values of the differences is calculated.

(2-3) In a case where the average value of the absolute values of the differences is more than a threshold value (e.g., 64), it is determined that the image has a small blur.

In a case where a blur occurs in an image, an edge of the image is blurred. This causes a reduction in absolute value of a difference between respective adjacent pixels, and ultimately causes a reduction in the average value of the absolute values of the differences between the respective adjacent pixels. Accordingly, the blur of the image can be determined by carrying out threshold value processing with respect to the average value of the absolute values of the differences between the respective adjacent pixels. A blur of an image occurs in a case where (i) the image is captured by a mobile terminal apparatus and (ii) the mobile terminal apparatus is not held steady or (iii) a camera of the mobile terminal apparatus is not focused on an object to be captured.

Note here that, in a case where it is determined that the image has a small blur, it is determined that a compact PDF file of the image can be generated, and a compact PDF file generation determining signal is outputted. Otherwise, the image is determined as an image unsuitable for the generation of the compact PDF file, and a compact PDF file generation determining signal is outputted. The following is the reason why, in a case where an image is blurred, it is determined that such an image is unsuitable for the generation of the compact PDF file. In the compact PDF file generation processing, in a case where an image is blurred, an accuracy of extracting a text part as a foreground mask is more reduced. This causes the text part to be more easily determined as a background layer. Since the background layer is subjected to compression processing with high compression efficiency, image quality is deteriorated in the text part which has been determined as the background layer, as compared with that of an image not blurred. For this reason, it is determined that the blurred image is unsuitable for the generation of the compact PDF file.

(3) In a case where the selected image data is undetermined

In a case where the selected image data is "undetermined" as a result of the image type determination, the compact PDF file generation determination cannot be made. Accordingly, in order to carry out the compact PDF file generation processing, it is determined, in accordance with a user setting, that a compact PDF file of the image can be generated, and a compact PDF file generation determining signal is outputted. In a case where it is determined that a type of the selected image data is undetermined, the display section 6 displays a screen prompting the user to select, as a file format, a PDF file or a compact PDF file.

<Acquisition of Information on Instruction Mark Indicating Outer Frame of Detected Image and Instruction Mark Indicating Whether or not Image is to be Properly Captured>

By the method described in the following steps (1) through (6), the display control section 24 obtains information on (i) an instruction mark indicating an outer frame of a detected image and (ii) an instruction mark indicating whether or not an image is to be properly captured. The following method is employed for processing carried out when an image is captured by the image-capturing section 4.

(1) An edge pixel is extracted from a selected image. The edge pixel is extracted with the use of, for example, a Canny filter. An edge image is then generated in which the edge pixel is expressed as "1," whereas a non-edge pixel is expressed as "0."

(2) Labelling processing is carried out in which different labels are provided to regions of respective connected edge pixels (connected edge regions).

(3) From the connected edge regions that have been labelled, a candidate of a region (a feature region; in a case where the captured object is a document, a region indicated by the document) including the boundary between the captured object (e.g., the document) and the background is extracted.

(4) In some images, an edge pixel other than that of the boundary between the captured object and the background may be extracted as a feature region. Accordingly, processing (straight line extraction processing) is carried out in which (i) from the feature region, groups of edge pixels arranged in a line segment which groups form upper, left, right, and lower sides of a rectangle which is a boundary between the rectangular captured object and the background, are extracted and (ii) approximate straight lines caused by the extracted groups of edge pixels are specified.

(5) Coordinates of intersections are obtained based on the equations of the respective approximate straight lines obtained in S4.

(6) Four straight lines (serving as a contour line of the captured object), obtained by connecting the coordinates of four vertexes, are displayed so as to be superimposed on the image. Note here that information on the four sides of the rectangle is entirely extracted. In a case where (i) coordinates of three vertexes are within the captured image area and (ii) coordinates of one vertex is outside the captured image area, first missing information (a first icon) is displayed. Note that the first missing information indicates that part (one corner) of the captured object cannot be captured. In a case where the extraction result indicates that (a) the coordinates of the four vertexes are included and (b) extraction incapability information indicating that no information on the four sides of the rectangle has been extracted is included, it is determined whether or not the coordinates of the four vertexes are within the captured image area. In a case where all of the coordinates of the four vertexes are within the captured image area, second missing information (a second icon) is displayed. Note that the second missing information indicates that part (one side) of the captured object cannot be captured. Note here that the "first icon" and the "second icon" are each an instruction mark indicating that an image is not properly to be captured. In a case where all of the coordinates of the four vertexes are within the captured image area, information (e.g., "OK"), indicating that the captured object is within the captured image area, is displayed.

3. Image Forming Apparatus

The following description will explain a configuration of the image forming apparatus 50. According to Embodiment 1, the image forming apparatus 50 is a multifunction printer that has functions of a scanner, a printer, a copying machine, and the like.

Figure 7:
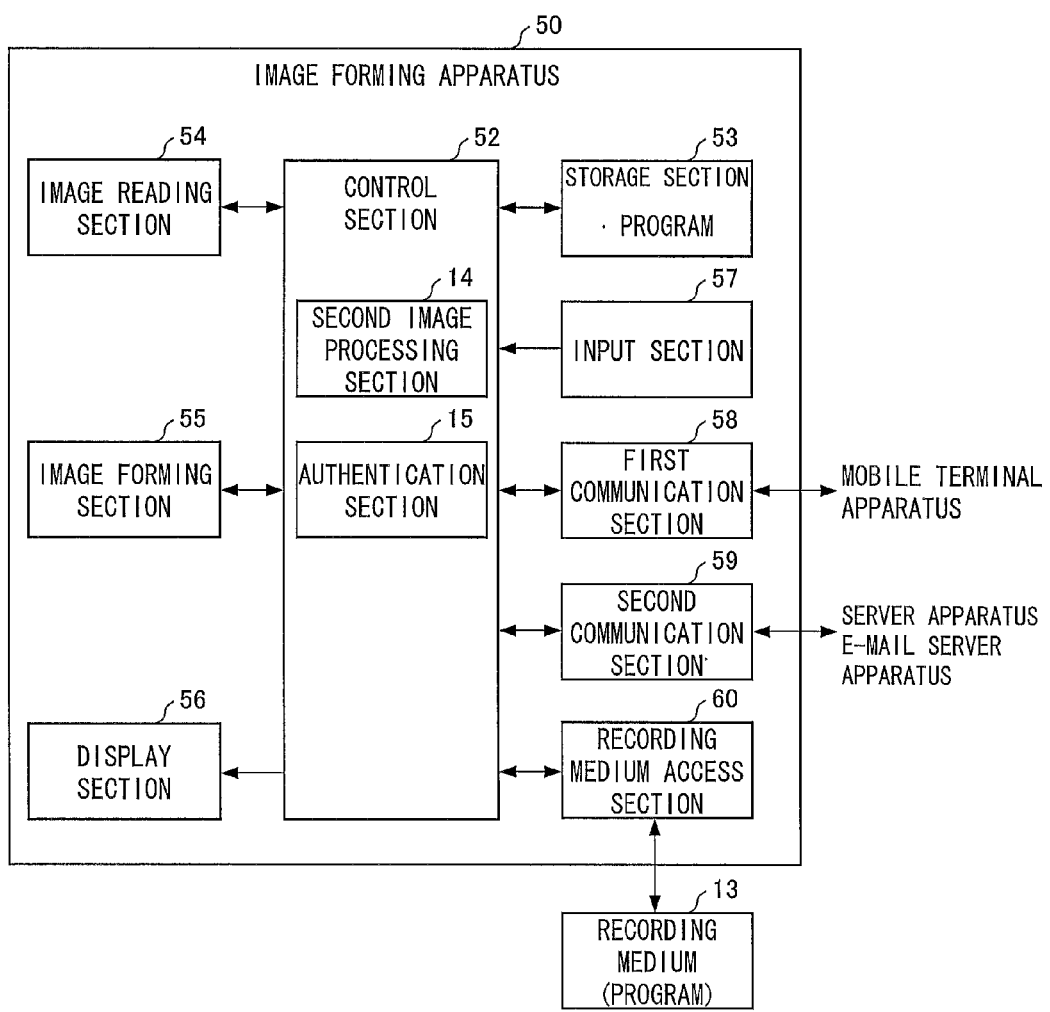
FIG. 7 is a block diagram illustrating a configuration of an image forming apparatus of an embodiment of the present invention.

FIG. 7 is a block diagram illustrating a configuration of the image forming apparatus 50. The image forming apparatus 50 includes a control section 52, a storage section 53, an image reading section 54, an image forming section 55, a display section 56, an input section 57, a first communication section 58, a second communication section 59, and a recording medium access section 60 (see FIG. 7).

The control section 52 comprehensively controls each block of the image forming apparatus 50. As with the control section of the mobile terminal apparatus 1, the control section 52 analyzes a header of a file stored in the storage section 53 so as to recognize a file format of the file. In a case of a TIFF file, the control section 52 determines whether the file is binary or multi-valued by confirming a tag. In a case where it is determined that the file is binary, the control section 52 carries out control so that no compact PDF file generation processing (later described) is carried out.

The control section 52 functions as (i) a second image processing section (image processing section) 14 which carries out given image processing with respect to received image data and (ii) an authentication section 15. The second image processing section 14 will be later described.

The authenticating section 15 authenticates a user before the processing, in which the image data received from the mobile terminal apparatus 1 is outputted, is carried out. Specifically, the authenticating section 15 authenticates a user by comparing (i) the user information received from the mobile terminal apparatus 1 and (ii) user information (user ID and password) inputted from the input section 57.

The storage section 53 stores various types of programs, various types of data, and the like which are used by the image forming apparatus 50.

The image reading section (scanner) 54 is a block which reads a document. The image reading section 54 includes a CCD (Charge Coupled Device). The image reading section 54 converts light reflected from a document into R, G and B electrical signals (analog image signals), and outputs them.

The image forming section 55 is a block which forms an image on a recording sheet such as a paper with the use of a method such as an electrophotographic printing method or an inkjet method. That is, the image forming section 55 is a block which carries out, as one of the output processing, printing processing in which an image represented by the corrected image data is printed onto a recording paper such as a sheet.

The display section 56 is a block which is realized by, for example, a liquid crystal display or the like and displays various types of images and various types of information. The input section 57 has a plurality of buttons by which a user enters a data input etc. A touch panel can be provided in which the display section 56 and the input section 57 are integrated with each other.

According to Embodiment 1, the first communication section 58 has a serial transfer/parallel transfer function based on USB (Universal Serial Bus) 1.1 or USB 2.0 and a wireless data communication function. The first communication section 58 receives, from the mobile terminal apparatus 1, image data to which the setting information is added.

The second communication section 59 has functions of (a) data communication utilizing a wireless technique based on any one of IEEE802.11a, IEEE802.11b, and IEEE802.11g, each of which is a standard of wireless LAN, (b) data communication, via a LAN cable, with a network having a function of a communication interface utilizing Ethernet (Registered Trademark), and (c) data communication utilizing a wireless technique based on any one of IEEE802.15.1 (so-called Bluetooth (Registered Trademark)), an infrared communication standard such as IrSimple, and a communication method such as Felica (Registered Trademark), each of which is a wireless communication standard.

The second communication section 59 carries out, as output processing, (i) filing processing in which image data, to which the predetermined image processing is carried out by the second image processing section 14, is stored in a server apparatus or (ii) e-mail sending processing in which an e-mail, to which the image data that has been subjected to the predetermined image processing is attached, is sent to an e-mail server apparatus.

The recording medium access section 60 is a block which reads out a program from a recording medium 13 in which the program is recorded.

3-1. Second Image Processing Section

The following description will explain the second image processing section. The second image processing section 14 carries out given image processing with respect to received image data. The second image processing section 14 includes an image quality adjusting section 64, a geometry distortion correction section 65, a lens distortion correction section 66, a high resolution processing section 67, a document detection section 68, a document correction section 69, a file generation section 70, and an output processing section 71 (see FIG. 8).

The image quality adjusting section 64 corrects color balance, contrast, and brightness of inputted image data.

The geometry distortion correction section 65 corrects geometry distortion of image data in a case where a user sets (selects) a geometry distortion correction. Specifically, the geometry distortion correction section 65 corrects distortion of an object, such as a poster or a manuscript paper, in rectangular image data, which distortion is caused by capturing the object from a direction different from a normal to a plane on which a document image is formed (i.e., distortion of a rectangular plane on which the document image is formed).

The lens distortion correction section 66 corrects lens distortion of image data, in a case where a user sets (selects) a geometry distortion correction. For example, the lens distortion correction section 66 sequentially detects edge pixels of an object in image data by raster scanning. Then, the lens distortion correction section 66 carries out a curve approximation with respect to the detected edge pixels, and then carries out a lens distortion correction on the basis of the equation of the approximated curve.

The high resolution processing section 67 makes, on the basis of a single set of image data to be outputted, a high resolution correction with respect to the single set of image data to be outputted. As for a method of creating a high-resolution image from a single image, some methods have been introduced in The Institute of Image Information and Television Engineers Journal Vol. 62, No. 2, pp. 181-189 (2008). Typically, the following processing (i) and (ii) are carried out: (i) edge direction interpolation processing in which an edge direction of an image pattern is detected and estimated and interpolation is carried out in accordance with the direction; and (ii) image quality improving processing in which influence of distortion caused by the interpolation and a noise component present in an input image, etc. are removed. Note that the edge direction interpolation processing will be later described.

Figure 9:
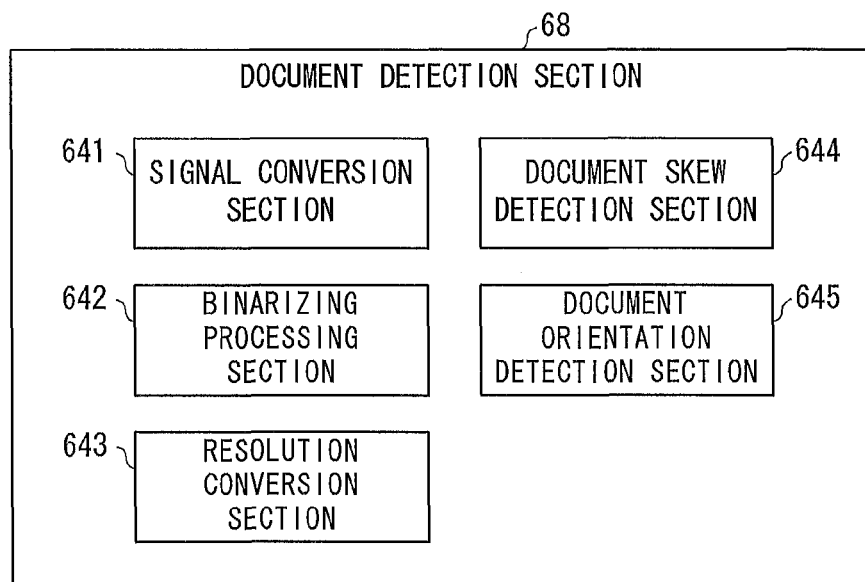
FIG. 9 is a block diagram illustrating a configuration of a document detection section of the second image processing section.

The document detection section 68 detects, with respect to image data, a skew of a document and a top-to-bottom direction from a top side of the document to a lower side of the document (document orientation). The document detection section 68 includes a signal conversion section 641, a binarizing processing section 642, a resolution conversion section 643, a document skew detection section 644, and a document orientation detection section 645 (see FIG. 9).

The signal conversion section 641 converts RGB color image data into a luminance signal. The conversion is made based on the following equation.

$$Yi = 0.30Ri + 0.59Gi + 0.11Bi,$$

where Y indicates a luminance signal of each pixel, R, G, and B each indicate a value of color component of each pixel, and i indicates a value given to each pixel (i is an integer not less than 1).

Alternatively, the signal conversion section 641 can convert an RGB signal into a CIE1976L*a*b* signal (CIE: Commission International de l'Eclairage; L*: brightness; a*, b*: chromaticity). Alternatively, the signal conversion section 641 can use a G signal.

The binarizing processing section 642 binalizes image data. In a case where the image data is 8 bits, for example, 128 can be used as a threshold value for binarization. Alternatively, an average of density (pixel value) in a block made up of a plurality of pixels (e.g., 5×5) can be used as a threshold value.

The resolution conversion section 643 reduces a resolution of binalized image data. The resolution conversion section 643 converts image data which has been read at a resolution of, for example, 1200 dpi or 600 dpi into image data whose resolution is 300 dpi. Examples of a method of converting a resolution encompass a nearest neighbor method, a bi-linear method, and a bi-cubic method, which are publicly known. The image data, whose resolution is 300 dpi, is outputted to the document skew detection section 644.

The document skew detection section 644 detects a skew of a document. Note that no document skew detection processing is carried out in a case where the geometry distortion correction is made. An example of a method of detecting the document skew will be later described. The document orientation detection section 645 detects a top-to-bottom direction from a top side of the document to a lower side of the document (document orientation). An example of a method of detecting the top-to-bottom direction from a top side of the document to a lower side of the document (document orientation) will be later described.

Figure 8:
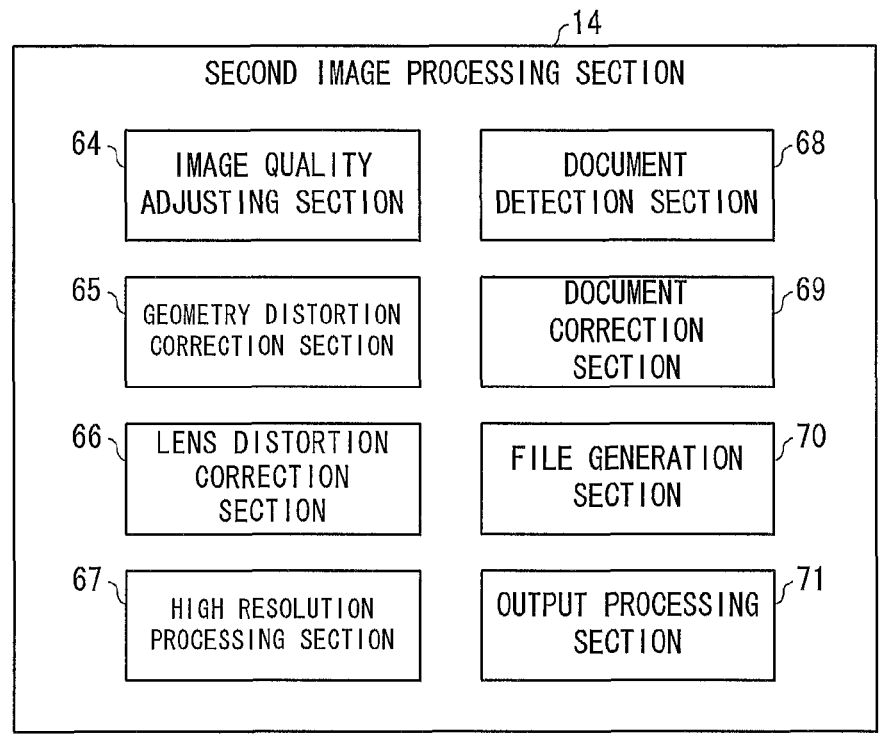
FIG. 8 is a block diagram illustrating a configuration of a second image processing section of the image forming apparatus.

The document correction section 69 corrects, with respect to image data, a skew of a document and an top-to-bottom direction from a top side of the document to a lower side of the document (document orientation) (see FIG. 8). The following equation indicates a relation between (i) coordinates of a document which has not been subjected to a skew correction and (ii) coordinates of the document which has been subjected to the skew correction by an angle θ counterclockwise around an origin. The document correction section 69 corrects the skew of the document by the following equation. Note that (X,Y) indicates the coordinates of the document which has not been subjected to a skew correction, whereas (X',Y') indicates the coordinates of the document which has been subjected to the skew correction.

$$\begin{pmatrix} X' \\ Y' \end{pmatrix} = \begin{pmatrix} \cos\theta & -\sin\theta \\ \sin\theta & \cos\theta \end{pmatrix} \begin{pmatrix} X \\ Y \end{pmatrix}.$$

The following equations each indicate a relation between (i) coordinates of a document which has not been subjected to a rotation and (ii) coordinates of the document which has been subjected to the rotation by 90 degrees, 180 degrees, or 270 degrees counterclockwise around the origin. The document correction section 69 corrects a top-to-bottom direction from a top side of the document to a lower side of the document (document orientation) by the following equations. Note that (X,Y) indicates the coordinates of the document which has not been subjected to the rotation, whereas (X',Y') indicates the coordinates of the document which has been subjected to the rotation.

Figure 10:
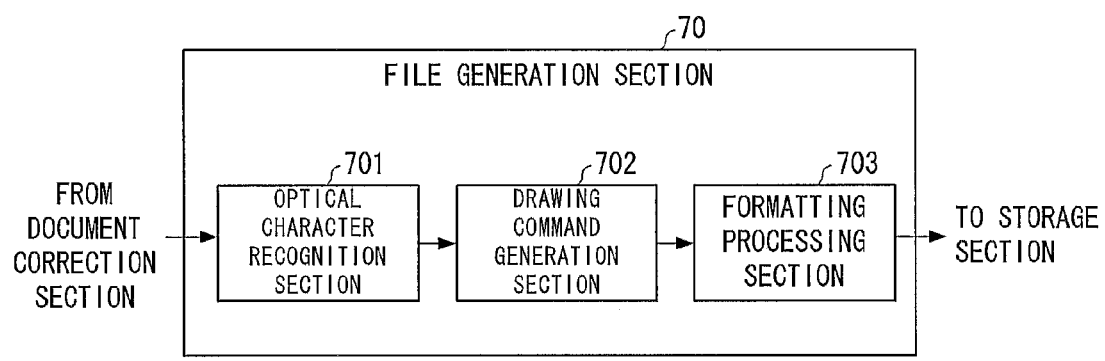
FIG. 10 is a block diagram illustrating a configuration of a file generation section of the second image processing section.

(When document is rotated by 90 degrees)
X'=Size of original image in Y direction−1−Y
Y'=X
(When document is rotated by 180 degrees)
X'=Size of original image in X direction−1−X
Y'=Size of original image in Y direction−1−Y
(When document is rotated by 270 degrees)
X'=Y
Y'=Size of image in X direction−1−X The file generation section 70 is a block which carries out processing in which a PDF file is generated from image data (image data is converted into a PDF file). The file generation section 70 includes an optical character recognition section 701, a drawing command generation section 702, and a formatting processing section 703 (see FIG. 10).

The optical character recognition section 701 extracts a feature of image data with the use of black and white binary data which has been outputted from the document detection section 68 and has a low resolution (e.g., 300 dpi). The optical character recognition section 701 then compares extracted feature of the image data with dictionary data (text database) so as to carry out optical character recognition.

The drawing command generation section 702 generates a transparent text of a result of the optical character recognition carried out by the optical character recognition section 701 and then generates a command for determining in which part of a PDF file the transparent text is to be allocated.

The formatting processing section 703 (i) converts, into a PDF file format, a file format of image data which has been subjected to image processing for display and (ii) embeds a transparent text in the image data in accordance with a drawing command. Note that, in a case where setting information received from the mobile terminal apparatus 1 contains information specifying a standard PDF file, that is, in a case where an output file format is a standard PDF file, all sets of image data for respective pages are compressed as a single JPEG image and are then embedded in a file with a PDF format. In a case where the setting information received from the mobile terminal apparatus 1 contains information indicating that the setting of the compact PDF file generation function is effective, that is, in a case where the output file format is a compact PDF file, (i) image data of a text region is compressed for each color as an MMR compressed image having a resolution (e.g., 300 dpi) which allows a text to be easily read and (ii) image data in regions other than the text region is compressed as a JPEG image having a resolution lower than that of the text region (e.g., 150 dpi). Thereafter, the image data of the text region and the image data of the regions other than the text region are embedded in a file with a PDF format.

A compact PDF file or a PDF file which has been processed by the format processing section 703 is stored in the storage section 53.

The output processing section 71 is a block which carries out output processing such as a segmentation process, a color correction process, a black generation and under color removal process, a spatial filter process, and a halftone process, in a case where the image data is subjected to outputting (e.g., printing, facsimile transmitting, image transmitting such as e-mail, and filing).

Note that the image forming apparatus 50 does not need to include the authentication section 15 and the high resolution processing section 67. Note also that the mobile terminal apparatus 1 can be arranged to transmit image data selected by a user to an image display apparatus (a display) (not shown) so that the image display apparatus carries out the processing carried out by the image forming apparatus 50 as described above. In a case where this processing is carried out by the image display apparatus, the image forming apparatus 50 does not need to include the image forming section 55 and the image reading section 54 illustrated in FIG. 7.

<Edge Direction Interpolation Processing>

The following description will explain, with reference to FIGS. 15 through 17, the foregoing edge direction interpolation processing carried out by the high resolution processing section 67. FIG. 17 is a flow chart illustrating an example of the edge direction interpolation processing.

First, the high resolution processing section 67 generates an edge image of an input image (S51). The high resolution processing section 67 carries out an edge extraction with the use of, for example, a first order differential filter (see FIG. 15), and then carries out binarizing processing. The high resolution processing section 67 then determines whether or not a target pixel is located on edge (S52). Specifically, in a case where a pixel value of the target pixel is 1 in the binarized image generated in the binarizing processing, the target pixel is determined as being located on edge. In a case where the target pixel is not determined as being located on edge (NO in S52), an interpolation pixel value is calculated by a commonly used interpolation method (e.g., a bi-linear method and a bi-cubic method) (S54). In a case where the target pixel is determined as being located on edge (YES in S52), a direction of the edge is extracted with the use of an N×N (N>1) partial image in which the target pixel is contained (S53). In accordance with a result of the extraction, a pixel value to be interpolated is calculated (S54). After the interpolation pixel value is calculated, interpolation image data is outputted (S55).

(a) through (d) of FIG. 16 show diagrams each illustrating an example of a method of determining a pixel value of an interpolation pixel. The following description will explain, with reference to (a) through (d) of FIG. 16, a method of calculating an interpolation pixel in accordance with an edge direction. (a) through (d) of FIG. 16 illustrate examples in each of which N is equal to 3, pixels located from (i) through (ix) are input pixels which are inputted in an order starting from upper left to lower right, and a pixel at a center is a target pixel (v). In the examples illustrated in (a) through (d) of FIG. 16, 2-fold resolution conversion is made both in a horizontal direction and in a vertical direction. A pixel A located on an upper left side of the target pixel, a pixel B located on an upper side of the target pixel, and a pixel C located on a left side of the target pixel are interpolation pixels to be obtained. In (a) through (d) of FIG. 16, the edge direction is indicated by a dotted line. (a) of FIG. 16 illustrates a case where an edge exists in a direction from upper left to lower right. (b) of FIG. 16 illustrates a case where an edge exists in the horizontal direction. (c) of FIG. 16 illustrates a case where an edge exists in a direction from upper right to lower left. (d) of FIG. 16 illustrates a case where an edge exists in the vertical direction. In each of the cases illustrated in (a) through (d) of FIG. 16, pixel values of pixels located in respective positions A, B, and C which are to be interpolated are calculated with the use of only pixels located along the edge direction. For example, in the case of (a) of FIG. 16, the reference pixels (i), (v), and (ix) are edge pixels and a line connecting these pixels is an edge line. Then, the pixel value VA (in (a) of FIG. 16, "V" is omitted. The same applies also to the other pixel values mentioned below) of the interpolation pixel A that is on the edge line is calculated by the following equation with the use of pixel values of the reference pixel (i) (pixel value V(i)) and the reference pixel (v) (pixel value V(v)) each of which is on the edge line and is adjacent to the interpolation pixel A:

$$VA=(V(i)+V(v))/2.$$

Meanwhile, the interpolation pixels B and C that are not on the edge line are each interpolated with the use of target reference pixels, out of reference pixels other than reference pixels on the edge line, on a line parallel to the edge direction which line contains a reference pixel (closest reference pixel) closest to a corresponding one of the interpolation pixels B and C. For example, in (a) of FIG. 16, as for the interpolation pixel B, a line, parallel to the edge direction which line contains the reference pixel (ii) which is the closest reference pixel, is a line connecting the reference pixels (ii) and (vi). An intersection of such a line and a perpendicular line dropped from the interpolation pixel B to such a line internally divides a line segment connecting the reference pixels (ii) and (vi). Accordingly, a pixel value VB of the interpolation pixel B is calculated by the following equation:

$$VB=(9\times V(ii)+4\times V(vi))/13$$

Similarly, the pixel value VC of the interpolation pixel C is calculated by the following equation with the use of a pixel value of the reference pixel (iv), which is the closest reference pixel, and a pixel value of the reference pixel (viii) on a line parallel to the edge direction which line contains the reference pixel (iv):

$$VC=(9\times V(iv)+4\times V(viii))/13$$

As for (i) the case where the edges exist in the horizontal direction, (ii) the case where the edges exist in the direction from upper right to lower left, and (iii) the case where the edges exist in the vertical direction, respective interpolation pixels can be obtained in a similar manner. Equations indicated in respective (b) through (d) of FIG. 16 show by which interpolation pixels A, B, and C are calculated in a case where the edges exist in the horizontal direction, the case where the edges exist in the direction from upper right to lower left, and the case where the edges exist in the vertical direction are calculated, respectively.

Note that (a) through (d) of FIG. 16 show only cases where the respective edge directions are linear. However, there are cases where an edge is curved in the N×N partial image. In a case where an edge is curved, for example, like the reference pixels (ii)-(v)-(iv), calculations are made by an equation similar to that of (d) of FIG. 16 as for the interpolation pixel A, an equation similar to that of (b) of FIG. 16 as for the interpolation pixel B, and an equation similar to that of (d) of FIG. 16 as for the interpolation pixel C. In a case where an edge is curved like the reference pixels (i)-(v)-(vii), calculations are made by an equation similar to that of (a) of FIG. 16 as for the interpolation pixel A, an equation similar to that of (a) of FIG. 16 as for the interpolation pixel B, and an equation similar to that of (c) of FIG. 16 as for the interpolation pixel C. Pixel values of interpolation pixels located around a reference pixel that has been determined to be an edge pixel are calculated in this manner.

In a case where the target pixel is not an edge, (i) a pixel value of the interpolation pixel A, which is an adjacent pixel on the upper left side of the target pixel, (ii) a pixel value of the interpolation pixel B, which is an adjacent pixel on the upper side of the target pixel, and (iii) a pixel value of the interpolation pixel C, which is an adjacent pixel on the left side of the target pixel are obtained by a commonly used interpolation calculation method (e.g. bilinear, bicubic).

Interpolation image data having both reference pixels and interpolation pixels is generated by carrying out the processes described above with respect to all of the reference pixels included in a single set of image data.

Then, a process in which image quality is improved is carried out with respect to generated interpolation image data. High-resolution image data is generated by causing the interpolation image data to be subjected to, for example, a noise removal filter, a sharpening filter, and/or the like. Specifically, it is possible to use, for example, a conventional unsharp mask and/or a sharpening filter which is obtained by changing the central coefficient of the filter of FIGS. 15 to 5. A median filter is widely employed as the noise removal filter. A more advanced technique is reported in which a Bilateral filter [Proceedings of the 1998 IEEE International Conference on Computer Vision] is employed, that allows both an edge keeping and an improvement in image quality to be achieved.

Note that a method of generating high-resolution image data is not limited to the aforementioned method. Alternatively, high-resolution image data can be generated from a single set of captured image data with the use of any of various methods described in The Institute of Image Information and Television Engineers Journal Vol. 62, No. 2, pp. 181 to 189 (2008).

<Detection of Skew of Document>

The following description will explain an example of processing in which a skew of a document is detected by the document skew detection section 644 of the foregoing document detection section 68. In Embodiment 1, a method disclosed in Japanese Patent Application Publication, Tokukaihei, No. 7-192086 A (1995) is used. First, a plurality of boundary points between respective black pixels and white pixels are extracted from binalized image data, and then coordinates data of the boundary points are obtained. The boundary between the respective black pixels and white pixels is stored by obtaining, for example, coordinates of a boundary point between the white pixel and the black pixel which boundary point is located at an upper end of each text. With reference to the coordinates data, a regression line is calculated. The regression coefficient b of the regression line is calculated by the following equation and is then stored.

$$b = \frac{Sxy}{Sx} \quad (1)$$

Note here that Sx and Sy indicate residual sums of squares of variables x and y, respectively. Sxy indicates a sum of the products of a residual of x and a residual of y. That is, Sx, Sy, and Sxy are indicated by the following equations (2) through (4), respectively.

$$Sx = \sum_{i=1}^{n} (x_i - x)^2 \quad (2)$$
$$= \sum_{i=1}^{n} x_i^2 - \left(\sum_{i=1}^{n} x_i\right)^2 / n$$

$$Sy = \sum_{i=1}^{n} (y_i - y)^2 \quad (3)$$
$$= \sum_{i=1}^{n} y_i^2 - \left(\sum_{i=1}^{n} y_i\right)^2 / n$$

$$Sxy = \sum_{i=1}^{n} (x_i - x)(y_i - y) \quad (4)$$
$$= \sum_{i=1}^{n} x_i y_i - \left(\sum_{i=1}^{n} x_i\right)\left(\sum_{i=1}^{n} y_i\right) / n$$

An angle of skew (θ) of an image is calculated on the basis of the regression coefficient b by the following equation.

tan θ=b

<Detection of Document Orientation>

The following description will explain an example of processing in which a top-to-bottom direction from a top side of the document to a lower side of the document (document orientation) is detected by the document orientation detection section 645 of the document detection section 68. In Embodiment 1, a method disclosed in Japanese Patent Application Publication, Tokukaihei, No. 6-189083 A (1994) is used. First, optical character recognition is carried out. Each text is extracted from a document, and each extracted text is patterned. This processing is carried out with the use of black and white binary data with a resolution of 300 dpi. Next, a feature of the text pattern is compared with text pattern information which has been made into a database. The comparison is made as follows. That is, the extracted text pattern is placed on the text pattern made into the database, and a color (black or white) of each pixel of the extracted text pattern is compared with that of a corresponding pixel of the text pattern made into the database. In a case where colors of all the pixels of the extracted text pattern match those of the respective pixels of the text pattern made into the database, such a text pattern made into the database is determined as an inputted text pattern. In a case where there is no such all matching, a text pattern having the largest number of the pixels which match those of the respective pixels of the extracted pattern is determined as an inputted text pattern. Note that, in a case where the number of matching as the result of the comparison does not reach a given matching ratio, it is determined that the text pattern is undetermined. This processing is repeated by rotating the extracted text pattern by 90 degrees, 180 degrees, and 270 degrees. The numbers of discriminable texts of the text pattern obtained by the aforementioned processing are compared for respective rotation angles. A rotation angle, at which the largest number of texts are discriminable, is determined as a direction of the texts, thereby determining a document orientation.

<Compact PDF File Generation Processing>

The following description will explain the compact PDF file generation processing which is carried out by the formatting processing section 703 of the file generation section 70. In the compact PDF file generation processing, the following steps (1) through (4) are carried out.

(1) Foreground mask generation processing is carried out in which a foreground mask indicative of a text pixel is extracted from an input image. In the foreground mask generation processing, a pixel which is determined as a text region in the segmentation processing is binalized so as to extract the text pixel.

(2) Foreground color indexing processing is carried out in which a foreground pixel color is indexed and a foreground index color table is generated. The foreground index color table includes (i) a foreground layer indicating an index image, (ii) each text color of the foreground layer, (iii) maximum coordinates and minimum coordinates of respective text color regions, and (iv) the number of pixels belonging to each of the index. The foreground color indexing processing can be carried out by a method disclosed in Japanese Patent Application Publication, Tokukai, No. 2002-94805 A. This method relates to indexing processing of a foreground color. According to the method, all foreground pixels are indicated by the limited number of colors when a foreground layer is generated. Specifically, the foreground image is finally indexed by updating the foreground index color table of the foreground pixel. In a case where it is determined that the foreground pixel color of each foreground pixel has already been registered on the foreground index color table, an index value having a closest color in the foreground index color table is assigned to the each foreground pixel. In a case where it is determined that no foreground pixel color of each foreground pixel has been registered on the foreground index color table, a new index value is assigned to the each foreground pixel and is registered on the foreground index color table. The foreground image is indexed by repeating the aforementioned processing.

(3) Background layer generation processing is carried out in which the foreground pixel is removed from the input image and a background layer is generated. In order to improve compression efficiency of the background layer, hole-filling processing is carried out with the use of peripheral background layer pixels which are located peripheral to the foreground pixel and are not foreground pixels. With reference to the background pixels which are located peripheral to the foreground pixel and are not foreground pixels, the background layer foreground pixel part is filled with the use of an average value of the background pixels. In a case where a background pixel which is not a foreground pixel is not present in a vicinity of the foreground pixel, a result of neighbor hole-filling processing is used. Alternatively, it is possible to carry out resolution reducing processing with respect to the background image by carrying out, with respect to the image which has been subjected to the hole-filling processing, interpolation processing such as simple decimation, nearest neighbor, bi-linear, or bi-cubic. For example, a resolution of the input image can be reduced by half.

(4) Binary image generation processing is carried out in which a binarized image of each index is outputted with the use of (i) the inputted foreground layer and (ii) coordinates information which has been generated in the foreground color indexing processing.

Suitable compression processing is carried out with respect to each layer. As described above, the foreground layer is compressed by the MMR (Modified Modified Read, lossless compression technique). On the other hand, the background layer is compressed by the JPEG (Joint Photographic Experts Group, lossy compression technique).

4. Processing Flow in Image Processing System

The following description will explain a flow of processing carried out by the image processing system of Embodiment 1.

In response to an instruction entered by a user from the input section 7, image data stored in the storage section 3 of the mobile terminal apparatus 1 is thumbnail-viewed or is displayed one by one by the display section 6. Alternatively, image data captured by the image-capturing section 4 is displayed by the display section 6. In a case where the image data displayed in response to the instruction entered by the user from the input section 7 is selected and an address of a destination to which the image data is to be transmitted is set (an address stored in the storage section 3 is selected or an address is directly inputted), the image data is transmitted from the communication section 5 to the destination. The selected image data is image data stored in the storage section 3 or image data captured by the image-capturing section 4. Examples of the destination encompass the image forming apparatus 50, a server apparatus (not shown), and an image display apparatus (not shown).

The following description will explain processing carried out with respect to the selected image data (the selected image). (a) of FIG. 12 is a flow chart illustrating processing carried out by the entire image processing system. (b) of FIG. 12 is a flow chart illustrating processing carried out by the mobile terminal apparatus 1. (c) of FIG. 12 is a flow chart illustrating processing carried out by the image forming apparatus 50.

When the processing starts, the mobile terminal apparatus 1 sets whether or not to carry out the following processing (A) through (E), and generates setting information (S21). Note here that the setting is carried out when the user selects and enters, from the input section 7 of the mobile terminal apparatus 1, whether or not to carry out the processing (A) through (E).
(A) Generation of compact PDF file
(B) Generation of searchable PDF file
(C) Geometry distortion correction or skew correction
(D) Improvement of image quality
(E) Document orientation correction In a case where the setting of each processing is carried out and the setting information is generated, processing is carried out by the mobile terminal apparatus 1 (S22). Specifically, as illustrated in (b) of FIG. 12, the mobile terminal apparatus 1 sequentially selects an image (S31), determines an image type of the selected image, and carries out compact PDF file generation determining processing in accordance with the image type so as to determine whether or not the selected image is suitable for generation of a compact PDF file (S32). In a case where (i) the selected image is determined to be unsuitable for the generation of the compact PDF file (NO in S32) and (ii) the compact PDF file generation function has been set in the setting in S21, the setting of the compact PDF file generation function in the setting information is disabled (OFF) (S33). Then, the selected image and various types of information (geometry distortion correction information, model information on the mobile terminal apparatus, user information, and setting information) are transmitted to the image forming apparatus 50 (S34).

Note here that the geometry distortion correction information is information on the aforementioned coordinates of the four intersections. As described above, the setting information is information which is set by the user. Examples of the setting information encompass information on whether the setting of the compact PDF file generation function is ON or OFF. The model information on the mobile terminal apparatus 1 is used to (i) carry out processing with respect to each terminal by which the image has been captured or (ii) change over a parameter. For example, the model information is used for the image quality adjusting section of the second image processing section 14 of the image forming apparatus 50 to change over a parameter.

In a case where it is determined that the selected image is suitable for the generation of the compact PDF file (YES in S32), the selected image and the various types of information (geometry distortion correction information, model information on the mobile terminal apparatus, user information, and setting information) are transmitted, as they are, to the image forming apparatus 50 (S34). It is then determined whether or not processing for all selected images is completed (S35). In a case where the processing for all the selected images is not completed (NO in S35), the processing is repeated from S32. In a case where the processing for all the selected images is completed (YES in S35), the processing carried out by the mobile terminal apparatus 1 is completed, and the processing proceeds to S23 in (a) of FIG. 12.

In S23, processing is carried out by the image forming apparatus 50. Specifically, the image forming apparatus 50 receives the selected image from the mobile terminal apparatus 1 (S41) (see (c) of FIG. 12). At this time, the image forming apparatus 50 also receives various types of information including the setting information. Next, the image forming apparatus 50 corrects color balance, contrast, and brightness in accordance with the user setting (S42). It is then determined whether the information included in the setting information is information on the geometry distortion correction or information on the skew correction (S43). In a case where the information included in the setting information is the information on the geometry distortion correction, the geometry distortion correction is made (S44). On the other hand, in a case where the information included in the setting information is the information on the skew correction, a skew is detected and corrected (S45). Thereafter, the high resolution correction is made with respect to the image (S46), and a corrected image is stored in the storage section 53. The processing proceeds to S24 in (a) of FIG. 12.

When S23 is completed (see (a) of FIG. 12), the image forming apparatus 50 carries out the following processing (i) through (v), in accordance with the setting information, with respect to the corrected image, and generates a PDF file: (i) document orientation correction processing (S24), (ii) optical character recognition processing (S25), (iii) drawing command generation processing (S26), (iv) compact PDF file generation processing (S27), and (v) formatting processing (S28). Note that the compact PDF file generation processing in S27 is carried out in a case where the setting information contains information indicating that the setting of the compact PDF file generation function is enabled (ON).

In this manner, the processing carried out by the image processing system in Embodiment 1 is completed.

Embodiment 2

In Embodiment 2, the following description will explain a case where image data is transmitted from the mobile terminal apparatus 1 to a server apparatus, instead of the image forming apparatus 50 of Embodiment 1. That is, according to Embodiment 2, the image processing system of the present invention is realized by the mobile terminal apparatus 1 and the server apparatus. Note that members which have functions identical with those shown in the drawings used in the explanation of Embodiment 1 are given identical reference numerals, and are not described in detail repeatedly.

According to Embodiment 2, the server apparatus constitutes the second image processing section 14, instead of the image forming apparatus 50 of Embodiment 1. FIG. 13 is a block diagram illustrating a server apparatus 100 of Embodiment 2. The server apparatus 100 is an apparatus realized by a computer. The server apparatus 100 includes an image processing section 110 having a second image processing section 14. The server apparatus 100 further includes a control section 101, an input apparatus 102, a display 103, a transmitting/receiving section 105, and a storage section 104. Note that the control section 101, the input apparatus 102, the display 103, the transmitting/receiving section 105, and the storage section 104 correspond to the control section 52, the input section 57, the display section 56, the first communication section 58 and the second communication section 59, and the storage section 53 of the image forming apparatus 50 (see FIG. 7), respectively, and are therefore not repeatedly described.

Alternatively, the image data can be transmitted from the mobile terminal apparatus 1 to an image display apparatus or the like, including the second image processing section 14, instead of the server apparatus 100 of Embodiment 1.

Embodiment 3

According to Embodiment 1, the second image processing section 14 is included in the image forming apparatus 50. Note, however, that Embodiment 3 deals with a configuration in which the second image processing section 14 is included in a mobile terminal apparatus. That is, according to Embodiment 3, the mobile terminal apparatus itself constitutes the image processing system of the present invention. Note that members which have functions identical with those shown in the drawings used in the explanation of Embodiment 1 are given identical reference numerals, and are not described in detail repeatedly.

FIG. 14 is a block diagram illustrating a mobile terminal apparatus 1b of Embodiment 3. The mobile terminal apparatus 1b includes a second image processing section 14, in addition to the configuration of the mobile terminal apparatus 1 illustrated in FIG. 1.

According to Embodiment 3, the mobile terminal apparatus 1b includes the second image processing section 14. Accordingly, a compact PDF file can be generated by the mobile terminal apparatus 1b. After the compact PDF file is generated by the second image processing section 14, it is possible for the generated compact PDF file (i) to be stored in the storage section 3, (ii) to be transmitted to the image forming apparatus 50 and be printed out, or (iii) to be transmitted to the server apparatus.

Embodiment 4

The mobile terminal apparatuses 1 and 1b, the image forming apparatus 50, and the server apparatus 100 each may be realized by (i) a logic circuit (hardware) provided in an integrated circuit (IC chip) or the like or (ii) software executed by a CPU (Central Processing Unit).

In the latter case (ii), the mobile terminal apparatuses 1 and 1b, the image forming apparatus 50, and the server apparatus 100 each include: a CPU that executes instructions of a program that is software realizing the foregoing functions; ROM (Read Only Memory) or a storage apparatus (each referred to as "recording medium") storing the program and various kinds of data in such a form that they are readable by a computer (or a CPU); and RAM (Random Access Memory) in which the program is loaded in executable form. The object of the present invention can be achieved by a computer (or a CPU) reading and executing the program stored in the recording medium. "A non-transitory tangible medium" can be employed as the recording medium. Examples of the non-transitory tangible medium encompass a tape, a disk, a card, a semiconductor memory, and a programmable logic circuit. The program may be supplied to or made available to the computer, via any transmission medium (such as a communication network or a broadcast wave) which enables transmission of the program. Note that the present invention can also be implemented by the program in the form of a computer data signal embedded in a carrier wave which is embodied by electronic transmission.

The present invention is not limited to the description of the embodiments above, but may be altered by a skilled person in the art within the scope of the claims. An embodiment based on a proper combination of technical means disclosed in different embodiments is encompassed in the technical scope of the present invention. Moreover, a new technical feature can be obtained from a proper combination of technical means disclosed in different embodiments.

Conclusion

An image determining apparatus (a mobile terminal apparatus 1) of Aspect 1 of the present invention is an image determining apparatus including: an image type determining section (81) which determines whether an input image is a scanned image scanned by a scanner or a captured image (a camera-captured image) captured by an image-capturing apparatus; and a format conversion determining section (a compact PDF file generation determining section 82) which determines, on the basis of a result of the determination by the image type determining section, whether or not the input image is suitable for conversion into a compressed image in a platform independent file format, the format conversion determining section (a) extracting (i) a feature regarding a resolution from the input image determined as the scanned image or (ii) a feature regarding a blur from the input image determined as the captured image and (b) making the determination on the basis of the extracted feature.

With the arrangement, the image determining apparatus determines (i) whether the input image is the captured image or the scanned image and (ii) whether the input image is suitable for the conversion into the compressed image in the platform independent file format (e.g., a compact PDF file) (i.e., whether the input image is suitable for the generation of the compressed image in the platform independent file format). This eliminates necessity for a user to confirm a type of the input image or a state of the input image so as to determine whether or not the input image is suitable for the conversion into the compressed image in the platform independent file format. This allows the user to save the trouble of selecting the function of converting (generating) the compressed image in the platform independent file format. The image determining apparatus extracts a feature from the captured image or the scanned image and determines whether the input image is suitable for the conversion into the compressed image in the platform independent file format. This allows the image determining apparatus to properly make the determination.

In addition to the configuration of the image determining apparatus of Aspect 1, an image determining apparatus of Aspect 2 of the present invention can be arranged such that in a case where the feature regarding the resolution falls within a predetermined range in which the resolution is determined to be relatively high, the format conversion determining section determines that the input image determined as the scanned image is suitable for the conversion into the compressed image in the platform independent file format.

With the arrangement, only in a case where the input image (captured image) has a high resolution and is suitable for the conversion into the compressed image in the platform independent file format, the input image is converted into the compressed image in the platform independent file format. This makes it possible to avoid deterioration in image quality of the compressed image in the platform independent file format, which deterioration is caused in a case where the input image has a low resolution.

Note here that the case where the feature regarding the resolution falls within a predetermined range in which the resolution is determined to be relatively high can be a case where the resolution is higher than a given threshold value.

In addition to the configuration of the image determining Apparatus of Aspect 1 or 2, an image determining apparatus of Aspect 3 of the present invention can be arranged such that in a case where the feature regarding the blur falls within a predetermined range in which a degree of the blur is determined to be relatively low, the format conversion determining section determines that the input image determined as the captured image is suitable for the conversion into the compressed image in the platform independent file format.

With the arrangement, only in a case where the input image (scanned image) has no blur and is suitable for the conversion into the compressed image in the platform independent file format, the input image is converted into the compressed image in the platform independent file format. This makes it possible to avoid deterioration in image quality of the compressed image in the platform independent file format, which deterioration is caused by a blur occurred while the captured image is being generated (captured).

Note here that the case where the feature regarding the blur falls within a predetermined range in which the degree of the blur is determined to be relatively low can be a case where it can be determined, on the basis of the feature regarding the blur, that the input image determined as the captured image is not blurred.

In addition to the configuration of the image determining apparatus of any of Aspects 1 through 3, an image determining apparatus of Aspect 4 of the present invention can be arranged to further include: a display section; and a display control section which controls the display section to display the input image, the display control section (a) extracting a region indicating a document from the input image determined as the captured image and (b) controlling the display section to display a line segment indicating at least an outer edge of the document.

With the arrangement, only in a case where the input image is a captured image, the range indicating the document is extracted from the input image and is displayed, i.e., what is called an extraction and display of the image is carried out. This makes it possible, without any trouble to the user, to prevent, when the input image is displayed, a scanned image stored without including a document edge or the like from being erroneously extracted and being displayed.

An image processing system of Aspect 5 of the present invention can be arranged to include: the image determining apparatus of one of Aspects 1 through 4; and an image processing section which converts the input image into an image in a platform independent file format on the basis of a result of the determination by the format conversion determining section of the image determining apparatus.

With the arrangement, the input image is converted into the image in the platform independent file format on the basis of the result of the determination regarding whether or not the input image is suitable for the conversion into the compressed image in the platform independent file format. This allows the user to generate a compressed image in the platform independent file format or an image in the platform independent file format without considering whether the input image is the captured image or the scanned image.

Note that the image determining apparatus of the present invention may be realized by a computer. In this case, the present invention encompasses (i) a program which allows the image determining apparatus to be realized by a computer by causing the computer to function as each section of the image determining apparatus and (ii) a computer-readable recording medium in which the program is recorded.

INDUSTRIAL APPLICABILITY

The present invention is applicable to, for example, an image determining apparatus which determines whether or not an image is suitable for conversion into a compact PDF file.

REFERENCE SIGNS LIST

1: Mobile terminal apparatus (image determining apparatus)
6: Display section
14: Second image processing section (image processing section)
22: First image processing section
23: Processing determining section
24: Display control section
50: Image forming apparatus
81: Image type determining section
82: Compact PDF file generation determining section (format conversion determining section)
83: Resolution determining section 84: Image determining section
100: Server apparatus
703: Formatting processing section

The invention claimed is:

1. An image determining apparatus comprising:
   an image type determining section which determines whether an input image is a scanned image scanned by a scanner or a captured image captured by an image-capturing apparatus; and
   a format conversion determining section which determines whether or not the input image is suitable for conversion into a compressed image in a platform independent file format,
   (i) in a case where the input image is determined to be the scanned image, the format conversion determining section (a) extracting a feature regarding a resolution from the input image and (b) determining, on the basis of the feature regarding the resolution, whether or not the input image is suitable for the conversion into the compressed image in the platform independent file format, and
   (ii) in a case where the input image is determined to be the captured image, the format conversion determining section (a) extracting a feature regarding a blur from the input image and (b) determining, on the basis of the feature regarding the blur, whether or not the input image is suitable for the conversion into the compressed image in the platform independent file format.

2. The image determining apparatus as set forth in claim 1, wherein, in a case where the feature regarding the resolution falls within a predetermined range in which the resolution is determined to be relatively high, the format conversion determining section determines that the input image determined as the scanned image is suitable for the conversion into the compressed image in the platform independent file format.

3. The image determining apparatus as set forth in claim 1, wherein, in a case where the feature regarding the blur falls within a predetermined range in which a degree of the blur is determined to be relatively low, the format conversion determining section determines that the input image determined as the captured image is suitable for the conversion into the compressed image in the platform independent file format.

4. An image determining apparatus as set forth in claim 1, further comprising:
   a display section; and
   a display control section which controls the display section to display the input image,
   the display control section (a) extracting a region indicating a document from the input image determined as the captured image and (b) controlling the display section to display a line segment indicating at least an outer edge of the document.

5. The image determining apparatus as set forth in claim 1, wherein the compressed image in the platform independent file format is a compact PDF image.

6. An image processing system comprising:
   the image determining apparatus recited in claim 1; and
   an image processing section which converts the input image into an image in a platform independent file format on the basis of a result of the determination by the format conversion determining section of the image determining apparatus.

7. A non-transitory tangible computer readable recording medium storing a program for causing a computer to function as each section of the image determining apparatus recited in claim 1.

* * * * *